US009353512B2

(12) United States Patent
McHale et al.

(10) Patent No.: US 9,353,512 B2
(45) Date of Patent: May 31, 2016

(54) HIGH PERFORMANCE TOILET WITH RIM-JET CONTROL CAPABLE OF ENHANCED OPERATION AT REDUCED FLUSH VOLUMES

(75) Inventors: James McHale, Hillsborough, NJ (US); Christophe Bucher, Hillsborough, NJ (US); David Grover, Hamilton, NJ (US); Jian Zhou, Glen Allen, VA (US)

(73) Assignee: AS IP Holdco, LLC, Piscataway, NJ (US)

(*) Notice: Subject to any disclaimer, the term of this patent is extended or adjusted under 35 U.S.C. 154(b) by 1021 days.

(21) Appl. No.: 13/366,241

(22) Filed: Feb. 3, 2012

(65) Prior Publication Data
US 2012/0198610 A1 Aug. 9, 2012

Related U.S. Application Data

(60) Provisional application No. 61/439,827, filed on Feb. 4, 2011.

(51) Int. Cl.
*E03D 11/02* (2006.01)
*E03D 11/08* (2006.01)

(52) U.S. Cl.
CPC ............ *E03D 11/08* (2013.01); *E03D 2201/30* (2013.01); *E03D 2201/40* (2013.01)

(58) Field of Classification Search
CPC .......... E03D 11/02; E03D 11/08; E03D 11/18
USPC .............................................. 4/421, 425, 428
See application file for complete search history.

(56) References Cited

U.S. PATENT DOCUMENTS

| 5,918,325 | A | 7/1999 | Arita et al. | |
|---|---|---|---|---|
| 6,715,162 | B2 | 4/2004 | Han et al. | |
| 7,661,153 | B2 * | 2/2010 | Nakamura et al. | 4/420 |
| 8,438,670 | B2 * | 5/2013 | Grover et al. | 4/421 |
| 2006/0005310 | A1 | 1/2006 | Nakamura et al. | |

(Continued)

FOREIGN PATENT DOCUMENTS

| CN | 101413288 A | 4/2009 |
|---|---|---|
| CN | 101849071 A | 9/2010 |

OTHER PUBLICATIONS

PCT International Search Report and Written Opinion, International Application No. PCT/US2012/023888, May 25, 2012, 13 pages.

(Continued)

*Primary Examiner* — Huyen Le
(74) *Attorney, Agent, or Firm* — Flaster/Greenberg P.C.

(57) ABSTRACT

A siphonic, gravity-powered toilet bowl assembly having a toilet bowl, which includes a bowl inlet in fluid communication with a source of fluid; a rim around an upper perimeter of the bowl defining a rim channel, having an inlet port in fluid communication with the bowl inlet and at least one outlet port; a bowl outlet in fluid communication with a sewage outlet; a direct-fed jet having an inlet port in fluid communication with the bowl inlet for receiving fluid and the bowl outlet for discharging fluid; and a control unit arranged in communication with the bowl inlet for controlling flow from the source of fluid passing through the bowl inlet into the inlet ports of the rim channel and the direct-fed jet, having a first extending rear portion and a second rim channel end portion, wherein the rear portion may extend at least partially into the bowl inlet.

67 Claims, 6 Drawing Sheets

(56) References Cited

U.S. PATENT DOCUMENTS

| | | | |
|---|---|---|---|
| 2009/0241250 A1 | 10/2009 | Grover | |
| 2009/0249537 A1 | 10/2009 | Jensen | |
| 2010/0043130 A1 | 2/2010 | Grover et al. | |
| 2010/0186158 A1* | 7/2010 | Morita et al. | 4/420 |

OTHER PUBLICATIONS

Chinese First Office Action for Counterpart Chinese Patent Application No. 2012800076264, Aug. 5, 2014, 21 pages.

PCT International Preliminary report on Patentability, Counterpart International Application No. PCT/US2012/023888, Aug. 6, 2013, 11 pages.

Response to Chinese First Office Action for Counterpart Chinese Patent Application No. 2012800076264, Feb. 25, 2015, 26 pages.

Chinese Second Office Action for Counterpart Chinese Patent Application No. 2012800076264, May 28, 2015, 3 pages.

Response to Chinese Second Office Action for Counterpart Chinese Patent Application No. 2012800076264, Aug. 11, 2015, 23 pages.

* cited by examiner

HIGH PERFORMANCE TOILET WITH RIM-JET CONTROL CAPABLE OF ENHANCED OPERATION AT REDUCED FLUSH VOLUMES

CROSS-REFERENCE TO RELATED APPLICATION

This application claims the benefit of priority under 35 U.S.C. §119(e) to U.S. Provisional Patent Application No. 61/439,827, dated Feb. 4, 2011, entitled, "High-Performance Toilet With Rim-Jet Control Capable of Enhanced Operation At Reduced Flush Volumes," the entire disclosure of which is incorporated herein by reference.

BACKGROUND OF THE INVENTION

1. Field of the Invention

The present invention relates to the field of gravity-powered toilets for removal of human and other waste. The present invention further relates to the field of toilets that can be operated at reduced water volumes.

2. Description of Related Art

Toilets for removing waste products, such as human waste, are well known. Gravity powered toilets generally have two main parts: a tank and a bowl. The tank and bowl can be separate pieces which are coupled together to form the toilet system (commonly referred to as a two-piece toilet) or can be combined into one integral unit (typically referred to as a one-piece toilet).

The tank, which is usually positioned over the back of the bowl, contains water that is used for initiating flushing of waste from the bowl to the sewage line, as well as refilling the bowl with fresh water. When a user desires to flush the toilet, he pushes down on a flush lever on the outside of the tank, which is connected on the inside of the tank to a movable chain or lever. When the flush lever is depressed, it moves a chain or lever on the inside of the tank which acts to lift and open the flush valve, causing water to flow from the tank and into the bowl, thus initiating the toilet flush.

There are three general purposes that must be served in a flush cycle. The first is the removal of solid and other waste to the drain line. The second is cleansing of the bowl to remove any solid or liquid waste which was deposited or adhered to the surfaces of the bowl, and the third is exchanging the pre-flush water volume in the bowl so that relatively clean water remains in the bowl between uses. The second requirement, cleansing of the bowl, is usually achieved by way of a hollow rim that extends around the upper perimeter of the toilet bowl. Some or all of the flush water is directed through this rim channel and flows through openings positioned therein to disperse water over the entire surface of the bowl and accomplish the required cleansing.

Gravity powered toilets can be classified in two general categories: wash down and siphonic. In a wash-down toilet, the water level within the bowl of the toilet remains relatively constant at all times. When a flush cycle is initiated, water flows from the tank and spills into the bowl. This causes a rapid rise in water level and the excess water spills over the weir of the trapway, carrying liquid and solid waste along with it. At the conclusion of the flush cycle, the water level in the bowl naturally returns to the equilibrium level determined by the height of the weir.

In a siphonic toilet, the trapway and other hydraulic channels are designed such that a siphon is initiated in the trapway upon addition of water to the bowl. The siphon tube itself is an upside down U-shaped tube that draws water from the toilet bowl to the wastewater line. When the flush cycle is initiated, water flows into the bowl and spills over the weir in the trapway faster than it can exit the outlet to the sewer line. Sufficient air is eventually removed from the down leg of the trapway to initiate a siphon which in turn pulls the remaining water out of the bowl. The water level in the bowl when the siphon breaks is consequently well below the level of the weir, and a separate mechanism needs to be provided to refill the bowl of the toilet at the end of a siphonic flush cycle to reestablish the original water level and protective "seal" against back flow of sewer gas.

Siphonic and wash-down toilets have inherent advantages and disadvantages. Siphonic toilets, due to the requirement that most of the air be removed from the down leg of the trapway in order to initiate a siphon, tend to have smaller trapways which can result in clogging. Wash-down toilets can function with large trapways but generally require a smaller amount of pre-flush water in the bowl to achieve the 100:1 dilution level required by plumbing codes in most countries (i.e., 99% of the pre-flush water volume in the bowl must be removed from the bowl and replaced with fresh water during the flush cycle). This small pre-flush volume manifests itself as a small "water spot." The water spot, or surface area of the pre-flush water in the bowl, plays an important role in maintaining the cleanliness of a toilet. A large water spot increases the probability that waste matter will contact water before contacting the ceramic surface of the toilet. This reduces adhesion of waste matter to the ceramic surface making it easier for the toilet to clean itself via the flush cycle. Wash-down toilets with their small water spots therefore frequently require manual cleaning of the bowl after use.

Siphonic toilets have the advantage of being able to function with a greater pre-flush water volume in the bowl and greater water spot. This is possible because the siphon action pulls the majority of the pre-flush water volume from the bowl at the end of the flush cycle. As the tank refills, a portion of the refill water is directed into the bowl to return the pre-flush water volume to its original level. In this manner, the 100:1 dilution level required by many plumbing codes is achieved even though the starting volume of water in the bowl is significantly higher relative to the flush water exited from the tank. In the North American markets, siphonic toilets have gained widespread acceptance and are now viewed as the standard, accepted form of toilet. In European markets, wash-down toilets are still more accepted and popular, whereas both versions are common in the Asian markets.

Gravity powered siphonic toilets can be further classified into three general categories depending on the design of the hydraulic channels used to achieve the flushing action. These categories are: non-jetted, rim jetted, and direct jetted.

In non-jetted bowls, all of the flush water exits the tank into a bowl inlet area and flows through a primary manifold into the rim channel. The water is dispersed around the perimeter of the bowl via a series of holes positioned underneath the rim. Some of the holes are designed to be larger in size to allow greater flow of water into the bowl. A relatively high flow rate is needed to spill water over the weir of the trapway rapidly enough to displace sufficient air in the down leg and initiate a siphon. Non-jetted bowls typically have adequate to good performance with respect to cleansing of the bowl and exchange of the pre-flush water, but are relatively poor in performance in terms of bulk removal. The feed of water to the trapway is inefficient and turbulent, which makes it more difficult to sufficiently fill the down leg of the trapway and initiate a strong siphon. Consequently, the trapway of a non-jetted toilet is typically smaller in diameter and contains bends and constrictions designed to impede flow of water.

Without the smaller size, bends, and constrictions, a strong siphon would not be achieved. Unfortunately, the smaller size, bends, and constrictions result in poor performance in terms of bulk waste removal and frequent clogging, conditions that are extremely dissatisfying to end users.

Designers and engineers of toilets have improved the bulk waste removal of siphonic toilets by incorporating "siphon jets." In a rim-jetted toilet bowl, the flush water exits the tank, flows through the manifold inlet area and through the primary manifold into the rim channel. A portion of the water is dispersed around the perimeter of the bowl via a series of holes positioned underneath the rim. The remaining portion of water flows through a jet channel positioned at the front of the rim. This jet channel connects the rim channel to a jet opening positioned in the sump of the bowl. The jet opening is sized and positioned to send a powerful stream of water directly at the opening of the trapway. When water flows through the jet opening, it serves to fill the trapway more efficiently and rapidly than can be achieved in a non-jetted bowl. This more energetic and rapid flow of water to the trapway enables toilets to be designed with larger trapway diameters and fewer bends and constrictions, which, in turn, improves the performance in bulk waste removal relative to non jetted bowls. Although a smaller volume of water flows out of the rim of a rim jetted toilet, the bowl cleansing function is generally acceptable as the water that flows through the rim channel is pressurized by the upstream flow of water from the tank. This allows the water to exit the rim holes with higher energy and do a more effective job of cleansing the bowl.

Although rim-jetted bowls are generally superior to non-jetted, the long pathway that the water must travel through the rim to the jet opening dissipates and wastes much of the available energy. Direct-jetted bowls improve on this concept and can deliver even greater performance in terms of bulk removal of waste. In a direct-jetted bowl, the flush water exits the tank and flows through the bowl inlet and through the primary manifold. At this point, the water is divided into two portions: a portion that flows through a rim inlet port to the rim channel with the primary purpose of achieving the desired bowl cleansing, and a portion that flows through a jet inlet port to a "direct-jet channel" that connects the primary manifold to a jet opening in the sump of the toilet bowl. The direct jet channel can take different forms, sometimes being unidirectional around one side of the toilet, or being "dual fed," wherein symmetrical channels travel down both sides connecting the manifold to the jet opening. As with the rim jetted bowls, the jet opening is sized and positioned to send a powerful stream of water directly at the opening of the trapway. When water flows through the jet opening, it serves to fill the trapway more efficiently and rapidly than can be achieved in a non jetted or rim jetted bowl. This more energetic and rapid flow of water to the trapway enables toilets to be designed with even larger trapway diameters and minimal bends and constrictions, which, in turn, improves the performance in bulk waste removal relative to non-jetted and rim jetted bowls.

Several inventions have been aimed at improving the performance of siphonic toilets through optimization of the direct jetted concept. For example, in U.S. Pat. No. 5,918,325, performance of a siphonic toilet is improved by improving the shape of the trapway. In U.S. Pat. No. 6,715,162, performance is improved by the use of a flush valve with a radius incorporated into the inlet and asymmetrical flow of the water into the bowl.

Although direct-fed jet bowls currently represent the state of the art for bulk removal of waste, there are still major areas for improvement. Government agencies have continually demanded that municipal water users reduce the amount of water they use. Much of the focus in recent years has been to reduce the water demand required by toilet flushing operations. In order to illustrate this point, the amount of water used in a toilet for each flush has gradually been reduced by governmental agencies from 7 gallons/flush (prior to the 1950's), to 5.5 gallons/flush (by the end of the 1960's), to 3.5 gallons/flush (in the 1980's). The National Energy Policy Act of 1995 now mandates that toilets sold in the United States can use water in an amount of only 1.6 gallons/flush (6 liters/flush). Regulations have recently been passed in the State of California which require water usage to be lowered ever further to 1.28 gallons/flush. The 1.6 gallons/flush toilets currently described in the patent literature and available commercially lose the ability to consistently siphon when pushed to these lower levels of water consumption. Thus, manufacturers are being and will continue to be forced to reduce trapway diameters and sacrifice performance unless improved technology and toilet designs are developed.

A second, related area that needs to be addressed is the development of siphonic toilets capable of operating with dual flush cycles. "Dual flush" toilets are designed to save water through incorporation of mechanisms that enable different water usages to be chosen depending on the waste that needs to be removed. For example, a 1.6 gallon per flush cycle could be used to remove solid waste and a 1.2 gallon or below cycle used for liquid waste. Prior art toilets generally have difficulty siphoning on only a 1.2 gallon or lower flush volume. Thus, designers and engineers reduce the trapway size to overcome this issue, sacrificing performance at the 1.6 gallon cycle needed for solid waste removal.

A third area that needs to be improved is the bowl cleansing ability of direct jetted toilets. Due to the hydraulic design of direct jetted bowls, the water that enters the rim channel is not pressurized. Rather, it spills into the rim channel only after the jet channel is filled and pressurized. The result is that the water exiting the rim has very low energy and the bowl cleansing function of direct jet toilets is generally inferior to rim jetted and non-jetted. This area is particularly affected when flush volume is reduced.

Prior attempts to solve these problems and introduce new solutions are known. U.S. Patent Publication No. 2010/0186158 A1 teaches a toilet that introduces a swirling effect as a result of splitting flow between a lower jet portion and a rim portion. In the rim flow, incoming water is split so as to flow evenly left and right into the rim, and a portion thereof is directed to various "slots" in the back of the rim portion that spout water tangentially into the bowl for improving cleaning and flush action.

U.S. Patent Publication No. 2009/0241250 A1 proposes to resolve the problems of the prior art by providing a pressurized rim and direct fed jet configuration that enables enhanced washing and adequate siphon for use with low volume water meeting current environmental water-use standards.

Therefore, there is a need in the art for a toilet which overcomes the above noted deficiencies in prior art toilets, i.e., it not only is resistant to clogging, but allows for sufficient cleansing during flushing, while allowing for compliance with water conservation standards and government guidelines, and still provides a pressurized rim and excellent cleansing function, as well as an adequate siphon for low water consumption for a variety of geometries, even as the size of a given siphonic, gravity-powered toilet bowl exceeds standard size so as to provide larger diameter trapway geometries for high efficiency flow.

BRIEF SUMMARY OF THE INVENTION

The present invention relates to a gravity-powered, siphonic flush toilet bowl for the removal of human and other waste, which can be operated at reduced water volumes without diminishment in its ability to remove waste and cleanse the toilet bowl and, which can be formed at a variety of toilet trapway geometries. In addition, when a design having a pressurized rim is implemented, such advantages can be achieved without losing the advanced cleansing function generally provided by use of a pressurized rim as in Publication No. 2009/0241250 A1 even as the trapway geometry is enhanced so as to be larger in diameter and/or trapway volume and/or when the jet outlet is also enlarged. This will allow powerful, cleansing flush performance even with low water volumes due to the unique design improvements described herein.

Advantages of various embodiments of the present invention include, but are not limited to providing a toilet that avoids the aforementioned disadvantages of the prior art, is resistant to clogging, provides a direct-fed jet toilet which may include a more effective, pressurized rim wash, that will perform well with various trapway geometries, including implementation of a very large trapway or jet port outlet, and designs wherein the ratio of trapway volume to flush volume exceeds 35%. In doing so, embodiments of the present invention can provide a toilet with a more powerful direct jet that takes full advantage of the potential energy available to it and eliminates the need for the user to initiate multiple flush cycles to achieve a clean bowl.

The present invention provides a toilet which is self-cleaning, and also provides all of the above-noted advantages at water usages at or below 1.6 gallons per flush and as low as 0.75 gallons per flush or lower.

Embodiments of the current invention provide a siphonic toilet suitable for operation in a "dual flush" mode, without significant compromise in trapway size and which is capable of use even in very large diameter trapway toilets.

The present invention may also provide a toilet with a hydraulically-tuned, direct jet path for greater performance and/or provide a toilet which reduces hydraulic losses.

In accordance with another embodiment of the present invention, a new and improved toilet assembly of the siphonic, gravity-powered type is provided which includes a toilet bowl that comprises a toilet bowl inlet in fluid communication with a source of fluid; a rim around an upper perimeter of the toilet bowl and defining a rim channel, the rim having an inlet port in fluid communication with the toilet bowl inlet and at least one rim outlet port; a bowl outlet in fluid communication with a sewage outlet; a direct-fed jet having an inlet port in fluid communication with the toilet bowl inlet for receiving fluid, the direct-fed jet also in fluid communication with a trapway and the bowl outlet for discharging fluid; and a control element having a rear portion, the control element arranged in communication with the toilet bowl inlet for controlling flow from the source of fluid passing through the toilet bowl inlet and dividing the flow of fluid entering the toilet bowl inlet into the inlet port of the rim channel and into the inlet port of the direct-fed jet, wherein the inlet port of the rim channel and the inlet port of the direct-fed jet are defined by the control element, and an end of the rear portion of the control element extends rearwardly at least about 5 mm so as to be within or beneath an area defined by the toilet bowl inlet. In preferred embodiments the ratio of the trapway volume to the total flush volume is at least about 35%, and can be about 40% to about 55%. Further, in another embodiment, the flush volume is less than about 4.8 liters.

The trapway may also be made so as to exceed 63.5 mm in diameter. The trapway volume may also be at least about 2000 ml.

The toilet bowl inlet may be positioned over a manifold area including the control element or positioned at a rear of the toilet bowl depending on the general desired design of the toilet bowl into which the control elements herein are to be introduced.

The control elements may also be generally transversely arranged within the toilet so that the body of the control element has an upper surface that divides flow over the top and bottom of the control element or may be generally vertically extending within the toilet bowl so as to have a surface of the body facing a side of the manifold and to direct flow to opposite sides of the body of the control element in a left and right manner instead of top and bottom as in a generally transversely aligned body. If generally vertically aligned, flow on one side may enter the rim channel and on the other side may enter the direct-fed jet, whereas in a generally transversely aligned body, flow over the top of the control element enters the rim channel and beneath the control element enters the direct-fed jet channel.

The control element may be configured so as to have, in one embodiment hereof as noted above, a generally transversely extending body having a rear portion and a rim channel end portion, and wherein the rear portion of the control element and the rim channel portion direct flow over the control element into the rim channel. In configurations where the tank (or other supply of flush water) is situated over the toilet bowl, it is preferable that the rear portion of the control element extends rearwardly into or beneath the area defined by the toilet bowl inlet by at least 5 mm as noted above and may extend in varying lengths as well, including at least about 5 mm to about 35 mm. The rear portion of the control element more preferably forms a generally upwardly extending wall directed towards or into the inlet of the toilet bowl. Further, the first extending rear portion of the control element may be configured so as to form an angle of 0° to about 90° with a horizontal transverse plane through the toilet bowl. The rear portion of the control element may also extend upwardly and through the toilet bowl inlet so that the end of the rear portion is within or above the toilet bowl inlet. The assembly can be formed so as to comprise a tank portion having an outlet in communication with the toilet bowl inlet. In this embodiment, the rear portion of the control element may be configured so as to extend upwardly into the tank.

In a further embodiment, the toilet is preferably capable of operating at a flush volume of no greater than about 6.0 liters and the water exiting the at least one rim outlet port is pressurized such that an integral of a curve representing rim pressure plotted against time during a 6.0 liter flush cycle exceeds 3 in. $H_2O.s$. In a preferred embodiment, the integral of a curve representing rim pressure plotted against time during a 6.0 liter flush cycle for the toilet exceeds 5 in. $H_2O.s$.

In yet a further embodiment herein, the toilet is capable of providing flow from the at least one rim channel outlet port which is pressurized in a sustained manner for a period of time, and preferably for at least 1 second during a 6.0 liter flush cycle. The toilet is preferably capable of providing the sustained pressurized flow from the at least one rim channel outlet port generally simultaneously with flow through the direct-fed jet.

In various embodiments herein, the toilet is capable of operating at a flush volume of not greater than about 4.8 liters.

The toilet can be made so as to include a mechanism that enables operation of the toilet using at least two different flush volumes, such as a dual-flush mechanism.

Preferably, in various embodiments, herein the toilet bowl inlet has a diameter of about 48 mm to about 150 mm, and more preferably about 63 mm to about 102 mm. Further, a ratio of a cross-sectional area of a rim channel inlet defined by the control element to a cross-sectional area of the toilet bowl inlet is preferably about 0.03:1 to about 0.50:1, and more preferably about 0.03:1 to about 0.35:1.

The direct-fed jet has an outlet port is preferably in fluid communication with the bowl outlet for discharging fluid and the direct-fed jet outlet port in one embodiment has a cross-sectional area of at least about 6.5 cm$^2$.

A further embodiment herein includes providing the control element with an optional feature, wherein a rim channel end of the control element comprises a raised portion configured to partially or completely divide flow into the rim channel into two separate and opposing streams each traveling away from the rim channel inlet and towards a front portion of the rim channel. In this embodiment, the raised portion of the rim channel end of the control element may be optionally formed so as to contact an upper wall of the rim. The toilet bowl may also further optionally include a downstream communication opening configured to allow flow of fluid and/or air from within the direct-fed jet into the rim channel. Such a downstream communication opening may be defined by the rim channel end of the control element and may also be positioned so as to be beneath the raised portion of the rim channel end of the control element and/or to preferably have a cross-sectional area of at least about 0.25 cm$^2$.

In another embodiment herein, the invention includes a siphonic, gravity-powered toilet bowl assembly having a toilet bowl, the toilet bowl comprising a toilet bowl inlet in fluid communication with a source of fluid; a rim around an upper perimeter of the toilet bowl and defining a rim channel, the rim having an inlet port in fluid communication with the toilet bowl inlet and at least one rim outlet port; a bowl outlet in fluid communication with a sewage outlet; a direct-fed jet having an inlet port in fluid communication with the toilet bowl inlet for receiving fluid and an outlet port in fluid communication with the bowl outlet for discharging fluid, wherein the direct-fed jet outlet port has a cross-sectional area of at least about 6.5 cm$^2$; and a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet, wherein the inlet port of the rim channel and the inlet port of the direct-fed jet are defined by the control element.

In this embodiment, the direct-fed jet may also be in fluid communication with a trapway having a trapway volume of at least about 2000 ml or a ratio of the trapway volume to total flush volume that is at least about 35%.

Further, in this embodiment, the control element may be formed so as to have a rim channel end having an optional raised portion configured to partially or completely divide flow into the rim channel into two separate and opposing streams each traveling away from the rim channel inlet and towards a front portion of the rim channel. The raised portion of the rim channel end of the control element may contact an upper wall of the rim. The toilet may also include an optional downstream communication opening configured to allow flow of fluid and/or air from within the direct-fed jet into the rim channel. The downstream communication opening may be defined by the rim channel end of the control element. The opening may also be on the rim channel end of the control element positioned so as to be beneath the raised portion of the rim channel end of the control element and/or the opening preferably has a cross-sectional area of at least about 0.25 cm$^2$.

In a further embodiment herein, the invention includes a siphonic, gravity-powered toilet bowl assembly having a toilet bowl, the toilet bowl comprising a toilet bowl inlet in fluid communication with a source of fluid; a rim around an upper perimeter of the toilet bowl and defining a rim channel, the rim having an inlet port in fluid communication with the toilet bowl inlet and at least one rim outlet port; a bowl outlet in fluid communication with a sewage outlet; a direct-fed jet having an inlet port in fluid communication with the toilet bowl inlet for receiving fluid and an outlet port in fluid communication with the bowl outlet for discharging fluid; and a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet, wherein the inlet port of the rim channel and the inlet port of the direct-fed jet are defined by the control element and the control element has a rim channel end that comprises a raised portion configured to partially or completely divide flow into the inlet of the rim channel into two separate and opposing streams each traveling away from the rim channel inlet and towards a front portion of the rim channel.

In this embodiment, the direct-fed jet may be in fluid communication with a trapway having a trapway volume of at least about 2000 ml or a ratio of the trapway volume to total flush volume of at least about 35%.

The raised portion of the rim channel end of the control element may be formed so as to contact an upper wall of the rim. The end of the rear portion of the control element may extend rearwardly at least about 5 mm so as to be within or beneath an area defined by the toilet bowl inlet. The toilet may further include an optional downstream communication opening configured to allow flow of fluid and/or air from within the direct-fed jet into the rim channel. The downstream communication opening may be defined by the rim channel end of the control element and also may be positioned so as to be beneath the raised portion of the rim channel end of the control element. The opening may have a preferred cross-sectional area of at least about 0.25 cm$^2$. The direct-fed jet outlet port may further have a cross-sectional area of at least about 6.5 cm$^2$.

In another embodiment, the invention includes a siphonic, gravity-powered toilet having a toilet bowl, the toilet bowl comprising a toilet bowl inlet in fluid communication with a source of fluid; a rim around an upper perimeter of the toilet bowl and defining a rim channel, the rim having an inlet port in fluid communication with the toilet bowl inlet and at least one rim outlet port; a bowl outlet in fluid communication with a sewage outlet; a direct-fed jet having an inlet port in fluid communication with the toilet bowl inlet for receiving fluid, the direct-fed jet also in fluid communication with the bowl outlet for discharging fluid; and a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet; wherein the inlet port of the rim channel and the inlet port of the direct-fed jet are defined by the control element and the toilet bowl is configured so that the rim channel and the direct-fed jet are capable of introducing fluid into the bowl in a sustained pressurized manner and wherein a ratio of a cross-sectional area of a rim channel inlet defined by the control element to a cross-sectional area of the toilet inlet is about 0.03:1 to about 0.50:1.

The ratio of the cross-sectional area of the rim channel inlet defined by the control element to the cross-sectional area of the toilet inlet may also be about 0.03:1 to about 0.35:1. In addition, in one embodiment, the ratio of the volume of the trapway to the total flush volume is at least about 35%. In one embodiment, the end of the rear portion of the control element extends rearwardly at least about 5 mm so as to be within or beneath an area defined by the toilet bowl inlet. The toilet may also include a downstream communication opening configured to allow flow of fluid and/or air from within the direct-fed jet into the rim channel. The opening may be defined by the rim channel end of the control element and positioned so as to be beneath the rim channel end of the control element.

A method is provided in the invention for providing a toilet capable of operating at a flush volume of no greater than about 6.0 liters and in a siphonic, gravity-powered toilet bowl assembly having a toilet bowl, a direct-fed jet and a rim defining a rim channel and having at least one rim channel opening, wherein fluid is introduced into the bowl through a toilet bowl inlet into the direct-fed jet and into the at least one rim channel opening. The method comprises introducing fluid from a fluid source through a toilet bowl inlet; and directing the fluid through a control element arranged in communication with the toilet bowl inlet for controlling flow from the source of fluid passing through the toilet bowl inlet so that a portion of the fluid enters an inlet port of a rim channel and a second portion enters an inlet port of a direct-fed jet, wherein the control element divides the flow of fluid entering the toilet bowl inlet into the inlet port of the rim channel and into the inlet port of the direct-fed jet, wherein the inlet port of the rim channel and the inlet port of the direct-fed jet are defined by the control element, and the second rim channel portion directs the flow over the control element into the rim channel, wherein fluid flows through a rim around an upper perimeter of the toilet bowl defining a rim channel from the rim channel inlet port to at least one rim outlet port, and fluid flows through a direct-fed jet from the direct-fed jet inlet port to a bowl outlet in fluid communication with a sewage outlet for discharging fluid, and wherein the fluid flows from the direct-fed jet into an interior of the toilet bowl under pressure and from the at least one rim channel opening in a sustained pressurized manner.

The method may also be practiced on a toilet capable of operating at a flush volume of not greater than about 4.8 liters. In addition, in the method, a ratio of a cross-sectional area of the a rim channel inlet defined by the control element rim channel inlet to a cross-sectional area of the toilet inlet may be about 0.03:1 to about 0.50:1. The direct-fed jet in the toilet in the method may be in fluid communication with a trapway having a trapway volume of at least about 2000 ml and/or the direct-fed jet outlet port may have a cross-sectional area of at least about 6.5 cm$^2$. Furthermore, the method can be practiced in toilet designs wherein the ratio of the trapway volume to the total flush volume is at least about 35%.

A control element may be provided in the method having a rim channel end that comprises a raised portion, in which case the method may further comprise dividing the first portion of fluid entering the rim channel into two separate and opposing streams each traveling away from the rim channel inlet and towards a front portion of the rim channel. The control element may be made so as to extend rearwardly at least about 5 mm so as to be within or beneath an area defined by the toilet bowl inlet. The toilet may also include a downstream communication opening so that the method further includes allowing fluid and/or air to flow from within the direct-fed jet into the rim channel.

In accordance with a further embodiment, the invention includes a toilet assembly of the siphonic, gravity-powered type which includes a toilet bowl that comprises a toilet bowl inlet in fluid communication with a source of fluid; a rim around an upper perimeter of the toilet bowl and defining a rim channel, the rim having an inlet port in fluid communication with the toilet bowl inlet and at least one rim outlet port; a bowl outlet in fluid communication with a sewage outlet; a direct-fed jet having an inlet port in fluid communication with the toilet bowl inlet for receiving fluid, the direct-fed jet also in fluid communication with a trapway and the bowl outlet for discharging fluid, wherein the trapway has a trapway volume of at least about 2000 ml; and a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet, wherein the inlet port of the rim channel and the inlet port of the direct-fed jet are defined by the control element.

The invention also includes within its scope a siphonic, gravity-powered toilet bowl assembly having a toilet bowl, the toilet bowl comprising a toilet bowl inlet in fluid communication with a source of fluid; a rim around an upper perimeter of the toilet bowl and defining a rim channel, the rim having an inlet port in fluid communication with the toilet bowl inlet and at least one rim outlet port; a bowl outlet in fluid communication with a sewage outlet; a direct-fed jet having an inlet port in fluid communication with the toilet bowl inlet for receiving fluid, the direct-fed jet also in fluid communication with a trapway and the bowl outlet for discharging fluid; and a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet, wherein the inlet port of the rim channel and the inlet port of the direct-fed jet are defined by the control element and the toilet further comprises a downstream communication opening for allowing flow of fluid and/or air from within the direct-fed jet to enter into the rim channel.

In one embodiment of this toilet, the toilet is capable of operating at a flush volume of not greater than about 4.8 liters. Further, the ratio of a cross-sectional area of the rim channel inlet defined by the control element to a cross-sectional area of the toilet inlet may be about 0.03:1 to about 0.50:1. The direct-fed jet may be in fluid communication with a trapway having a trapway volume of at least about 2000 ml and/or the direct-fed jet outlet port has a cross-sectional area of at least about 6.5 cm$^2$ and/or a ratio of a volume of the trapway to a total flush volume of at least about 35%. In another embodiment, the control element may have a rim channel end that comprises a raised portion for further dividing flow through the first portion of fluid entering the inlet of the rim channel into two separate and opposing streams each traveling away from the rim channel inlet and towards a front portion of the rim channel. Further, the end of the rear portion of the control element may be positioned so as to extend rearwardly at least about 5 mm so as to be within or beneath an area defined by the toilet bowl inlet. In addition, the downstream communication opening may be formed so as to be defined by the rim channel end of the control unit and to be positioned so as to be beneath the raised portion of the rim channel end of the control element. In a further embodiment, the downstream communication opening may have a cross-sectional area of at least about 0.25 cm².

Various other advantages, and features of the present invention will become readily apparent from the ensuing detailed description and the novel features will be particularly pointed out in the appended claims.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
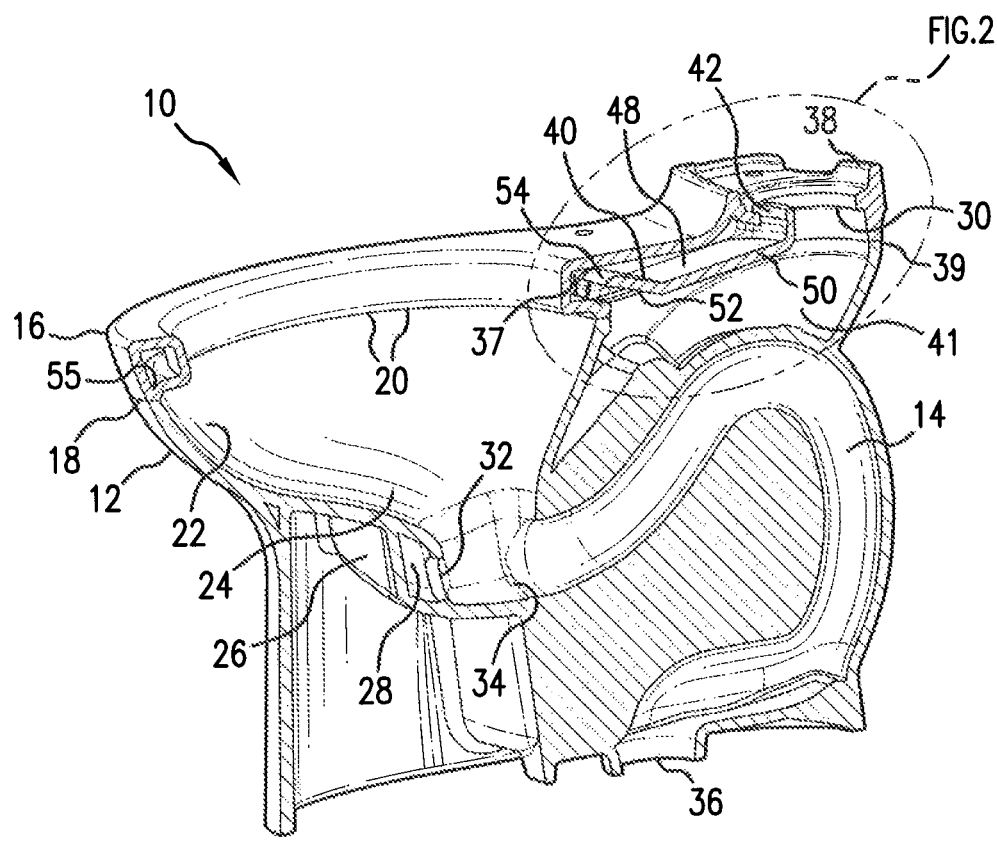
FIG. 1 is perspective, longitudinal, cross-sectional view of a toilet bowl portion of a toilet bowl assembly according to an embodiment of the invention.

As used herein, words such as "inner" and "outer," "upper" and "lower," "forward" and "backward," "front" and "back," "left" and "right," "upward" and "downward" and words of similar import are intended to assist in understanding the preferred embodiment of the invention with reference to the accompanying drawing Figures with respect to the orientation of the toilet assembly as shown, and are not intended to be limiting to the scope of the invention or to limit the invention scope to the preferred embodiment as shown in the Figures.

While prior inventions in the field of direct-fed jetted, high-performance flush toilets as noted above have improved the art greatly, their design configurations are not yet readily applicable when toilets are made with larger diameter trapways, e.g., those having a trapway diameter of greater than about 2.25 inches and/or a large trapway volume. Such large trapways generally require faster velocity water feed to initiate a siphon, which in turn requires larger jet channels and jet ports as well as a larger primary manifold. The toilet described in 2009/0241250 A1 performs well in such circumstances, even at low flush volumes. When features of the toilet geometry are enlarged so as to exceed certain dimensions, the toilet still performs adequately, but it tends to become more difficult to ensure adequate flow of pressurized water to the rim of the toilet, and so bowl washing performance of the toilet can be negatively affected. Attempts to couple larger jet diameters with narrower sized trapways to obtain a siphon function as quickly as possible in low water consumption use can assist in this problem, but can create flushing issues with waste in a smaller trapway. As a result, when attempting to enlarge the trapway with a low water consumption use, siphon performance can be affected.

A related area in which the present invention provides an improvement over the prior art is in ultra high efficiency siphonic toilets with flush volumes below 4.8 liters. Although such designs might incorporate smaller diameter trapways (for example, about 2 inches) with lower volumes, the same reduced flow to the rim can be experienced when applying the design principles taught in 2009/0241250 A1. In general, the ratio of the total flush volume to the volume of the trapway affects the applicability of the principles taught in 2009/0241250 A1 and the designs of other prior art high-efficiency toilets. Applicants have determined that when this ratio nears and exceeds about 35%, the flow of water to the rim can be diminished to the point that the bowl cleaning performance is negatively impacted. When this ratio nears and exceeds about 45% and upwards of about 55%, the performance impact is even more significant.

A ratio of the trapway volume to the total flush volume of at least about 35% can occur in several different applications or scenarios. Firstly, such a ratio can occur in the design of an ultra high efficiency toilet with flush volume, for example, near or below 4,000 ml and trapway volumes near or below 1,600 ml (50.8 mm diameter). Secondly, such a ratio can occur in the design of a high efficiency toilet with flush volume meeting the U.S. E.P.A.'s WaterSense® requirement of 4,800 ml and equaling the largest commercially available siphonic trapway volume of about 2,300 ml (60.3 mm diameter). And furthermore, the invention can be used to produce toilets with never before achieved sizes of siphonic trapways with volumes near 2,750 ml (66.7 mm diameter) and flush volumes near 6,000 ml.

The toilet system described herein provides the advantageous features of a rim-jetted system as well as those of a direct-jetted system that is capable of operation with low water volumes while maintaining excellent waste removal and bowl cleansing functions, even in toilets having a larger diameter and/or larger volume trapway and/or an enlarged jet port outlet. In preferred embodiments herein, the inner water channels of the toilet system are designed in such that the water exiting the rim of the direct-jetted system is pressurized and does not lose pressurization regardless of whether the design of the toilet is modified so as to have a variety of potential toilet geometries, including a larger diameter and/or larger volume trapway and/or a larger jet outlet port or other enlargements of the jet dimensions (such as a larger diameter jet). The toilet is able to maintain resistance to clogging consistent with today's 1.6 gallons/flush toilets while still delivering superior bowl cleanliness at reduced water usages and/or designs wherein the ratio of the volume of the trapway to the total flush volume is about 35% or greater.

Figure 5:
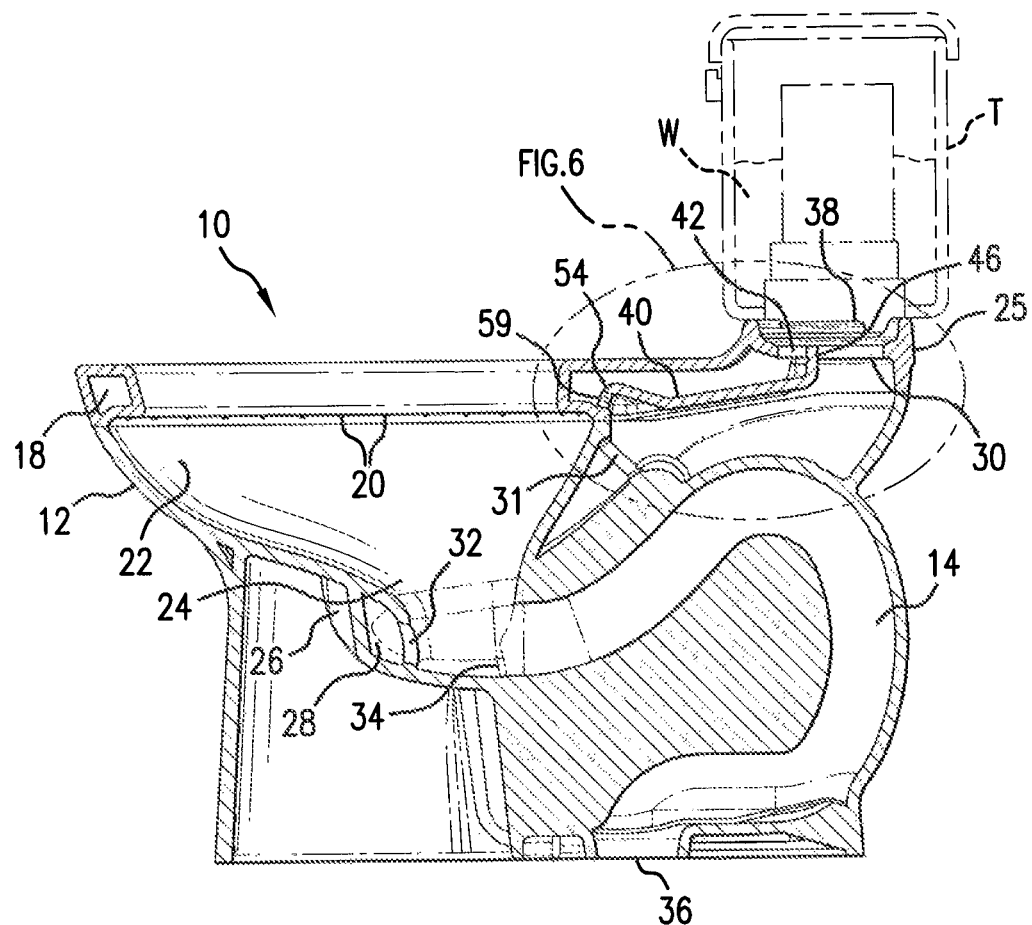
FIG. 5 is a side elevational, longitudinal cross-sectional view of the toilet bowl assembly according to an embodiment of the invention.

The invention will be described in accordance with a preferred embodiment as shown in FIGS. 1 and 5. However, it should be understood that other variations of the invention and other embodiments herein are well within the scope of the invention and the invention should not be considered limited by the embodiments as shown. FIGS. 1 and 5 show a siphonic, gravity powered toilet bowl assembly, generally referred to as toilet bowl assembly 10. The assembly 10 includes a toilet bowl 12 and a water source such as tank T (shown in phantom in FIG. 5). The water source may be a flush valve connected directly to plumbing in the wall as in many industrial or commercial toilets or may include a tank T which may optionally include various flush valve designs as shown for illustration purposes in FIG. 5. Such a tank may be any type of tank known in the art or to be developed which may be integral with (as in a unitary toilet) or attached (as in a two-piece toilet) to a toilet bowl via a bowl connecting piece. The tank or other water source W is for delivering fluid to the toilet bowl 12. The toilet bowl 12 may be attached to a toilet tank as shown or a wall-mounted flush system engaged directly with a plumbing system (not shown) to form a toilet assembly according to the invention. Thus, any toilet assembly having the toilet bowl as described and claimed herein is within the scope of the invention and may be used with the control element described further hereinbelow. The nature and mechanisms for introducing fluid into the toilet bowl inlet for flushing the toilet, whether from a tank or other fluid source, is not important or limiting to the nature and scope of the invention. As such, a tank or any other water source known in the art or to be developed may be used with the toilet bowl in the toilet bowl assembly of the present invention.

As will be explained in greater detail below, preferred embodiments of toilet bowl assemblies having a toilet bowl according to the invention are capable of delivering exceptional bulk waste removal and bowl cleansing at flush water volumes no greater than about 6.0 liters (1.6 gallons) per flush and more preferably 4.8 liters per flush (1.3 gallons) and more preferably 3.8 liters (1.0 gallons) per flush, for a variety of trapway volumes and/or diameters, including trapways having varying diameters from small to large, e.g., 2.25 inches or greater and also in toilets wherein the ratio of the trapway volume to a total flush volume is at least about 35%. It should be understood by those skilled in the art based on this disclosure that by being capable of achieving these criteria at flush volumes of about 6.0 liters or less and with a variety of toilet trapway, jet and rim geometries, including larger diameter trapways and larger jet ports, it does not mean that the toilet assembly and toilet bowl herein does not also function well with smaller or standard diameter trapways, and/or with a variety of varying jet to trapway diameter ratios and/or with higher flush volumes. The invention generally achieves good flush capabilities in smaller and larger toilets and at lower and higher flush volumes. Toilet bowls as described herein can operate at a wide range of flush volumes and using a wide variety of sizes including large diameter trapways and still achieve advantageous waste removal and bowl cleansing even at lower flush volumes of 6.0 liters or below and/or with large diameter and/or higher volume trapways and/or larger jet outlet ports to meet tough water conservation requirements while maintaining excellent flushing and cleansing capabilities.

As shown in FIG. 1, the toilet bowl 12 includes a trapway 14, a rim 16 configured so as to define a rim channel 18 therein. The rim channel has at least one outlet port 20 therein for introducing fluid, such as flush water, into the bowl portion 22 of the toilet bowl 12 from within the rim channel 18. The assembly includes a bottom sump portion 24. A direct-fed jet 26 includes a jet channel or passageway 28 extending between a direct-fed jet inlet port 30, as explained further below, to a direct-fed jet outlet port 32. As shown, there is one such channel 28 running so as to curve outward around the bowl portion 22 within the overall structure, however, the toilet bowl is shown in cross-sectional view in FIG. 1 and another similar channel (not shown) can be, and preferably is, made to lie in the same manner as channel 28 on the opposite side of the bowl. Multiple channels of varying size may also be used, and the channel 28 is shown for illustrative purposes only. Most preferred are two such channels, with one on either side of the bowl portion 24. The channel(s) 28 feed into a single direct-fed jet outlet port 32, however, it should be understood based on this disclosure that more than one such direct-fed jet outlet may be provided, each at the end of a channel 28 or at the end of multiple such channels. However, it is preferred to concentrate the jet flow from the dual channels as shown into a single direct-fed jet outlet 32. The toilet bowl has an outlet 34 which is also the general entrance to the trapway 14. The trapway 14 is curved as shown to provide a siphon upon flushing and empties into a sewage outlet 36 and can take a variety of geometrical forms including but not limited to the trapway design described in US Patent Application Publication 2010/0043130 A1, incorporated herein by reference.

The toilet bowl 12 further has a toilet bowl inlet 38 which is in communication with a source of fluid W, such as flush water from a tank T, wall-mounted flush valve directly piped through the wall where fluid enters through the back of the manifold of the bowl instead of through the top of the bowl, etc., each capable of providing fluid such as water from a city, municipality or other fluid supply source. Thus, as shown in FIGS. 1-6, toilet bowl inlet appears on an upper portion of the toilet bowl 12, but based on this disclosure, one skilled in the art would understand that the principles of the control element 40 as described herein would work equally well if the toilet bowl inlet were positioned on the rear 25 of the toilet bowl and extending therethrough. Flush water would thus enter transversely into the toilet bowl and not longitudinally from an upper tank or piping.

Tank T can be coupled above the back portion of the toilet bowl 12 over the toilet bowl inlet 38. Alternatively, a tank could be made which is integral to the body of the toilet bowl 12 to form an assembly 10, provided it were located above the toilet bowl inlet 38. Such a water source, such as tank T contains or provides water used for initiating siphoning from the bowl to the sewage line, and preferably also includes a valve mechanism for refilling the bowl with fresh water after the flush cycle. Any such valve or flush mechanism is suitable for use with the present invention. The invention also is able to be used with various dual- or multi-flush mechanisms. It should be understood therefore by one skilled in the art based on this disclosure that any tank, flush mechanism, etc. in communication with a water source capable of actuating a flushing siphon and introducing water into the inlet 38, including those mechanisms providing dual- and multi-flush which are known in the art or to be developed at a future date may be used with the toilet bowl assembly herein provided that such mechanism(s) can provide fluid to the bowl assembly and are in fluid communication with the inlet port of the rim channel and the inlet port of the direct-fed jet.

The inlet 38 as shown is on the top of the toilet bowl over the manifold which may be configured to have the control element described herein and the inlet is in communication with the fluid/water source, such that water enters the toilet bowl generally longitudinally from the tank. However, it should be understood, based on this disclosure and knowledge in the art, that toilet bowls may have inlets located on the rear portion of the bowl, as is more generally common in commercial or industrial use, in which case an inlet 38 can also be positioned on a rear wall 39 of the toilet bowl with fluid entering the toilet generally transversely instead of generally longitudinally.

Figure 3:
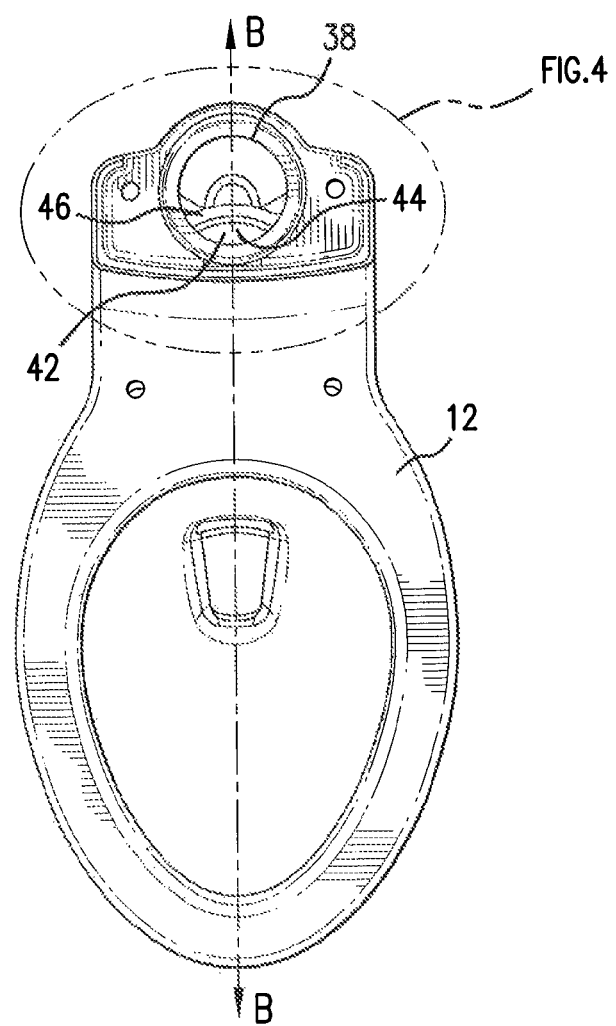
FIG. 3 is a top plan view the toilet bowl of FIG. 1.
Figure 4:
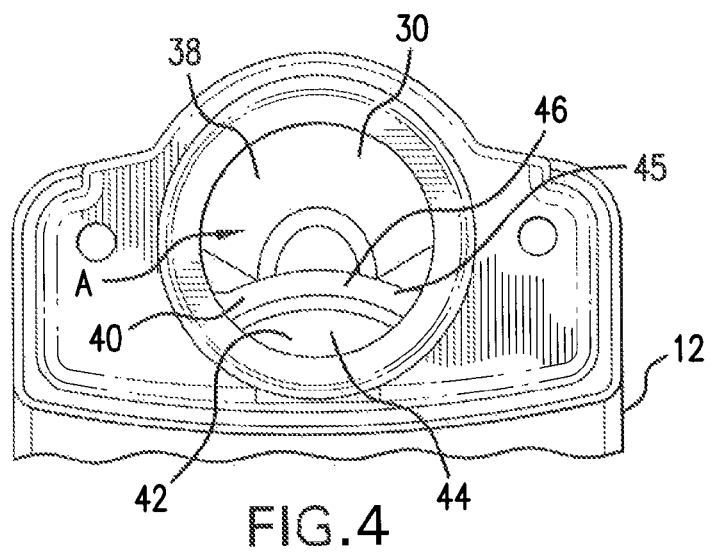
FIG. 4 is an enlarged view of a portion of the toilet bowl view of FIG. 3.

One embodiment of the inlet 38 is shown best in FIGS. 3 and 4, and is divided when viewed from above the bowl 12. The division is created by a control element 40 which can be pre-formed into the chinaware or other manufacturing material of the toilet bowl, or can be an inserted piece that is retrofit into a standard bowl. As shown, the control element 40 is configured to split flow and direct the flow in a controlled manner from the toilet inlet 38 directly into the rim channel 18 or the jet channel 28. In doing so, the actual inlets to these respective parts are moved so as to begin just below the toilet bowl inlet where the controlled split begins. The control element is configured to extend the rim inlet back into what is the traditional manifold area 41 of the toilet bowl so that fluid enters the rim channel over the control element. Thus, the traditional inlet 37 where flow enters the rim channel is pushed back so as to form a rim channel inlet 42 for the rim channel 18 located in the area 44, wherein the new rim channel inlet 42 is defined by the control element 40 depending upon how the rear portion 46 of the control element 40 is configured when it is situated and/or formed in place in the toilet bowl 12 in what is typically the manifold area 41 below the toilet inlet 38. As used herein, the rim channel inlet 42 refers to the inlet defined by the control element and is in the location where fluid passes over the rear portion 46 of the control element such that the fluid is forced to enter the rim channel 18 over the control element. The traditional rim channel inlet 37 is the entrance into the actual interior of the rim and is located where at the point where fluid has passed over the control element 40 and begins to enter the interior of the rim 16 within the rim channel 18. As flow over the control element 40 is split by the control element to pass to the right and left into the interior of the rim channel in this embodiment, there are actually two traditionally located rim channel inlets or entrances into the rim channel (one on each side of the control element at the onset of the rim channel). Thus, fluid enters through the toilet inlet, passes through the rim channel inlet 42 (and begins a separate path to the rim channel), over the control element, into one or more traditional entrances/inlets 37 into the interior of the rim channel 18 from the control element and out the rim channel outlet(s).

As can be seen in FIGS. 3 and 4, the flow from the toilet inlet is divided so as to begin at rim channel inlet 42 in a divided manner and on a separate path. This is distinguished from a traditional toilet design in which fluid enters the toilet inlet and flows into an open manifold and then flows in an uncontrolled manner based on the volume of the manifold and flush cycle downward into the direct jet and into a rim 16. In such prior art designs, the amount and nature of the fluid flow to the rim or direct jet is difficult to control. By locating the rim channel inlet 42 at the rear portion 46 or mouth of the control element such that fluid entering through the toilet inlet 38 flows directly over the control element 40 as rim channel flow entering at inlet 42, passing over the control element and a traditional rim channel inlet 37, flow may be designed in a controlled manner. As water from the toilet inlet 38 enters the control element, it passes into the area 44 which, in this embodiment, is formed by the rear portion 46 of the control element, which as shown, is configured in this embodiment so as to be upwardly extending in the toilet bowl.

The embodiment of FIGS. 1-6 includes a control element which is configured so as to be generally transversely oriented. Thus, it extends for the most part from the front to the back in the toilet bowl 12. It may be angled with the horizontal so as not to be level with the horizontal as well. In other embodiments shown herein, the control element can be made to be longitudinally oriented (see assembly embodiment 200 herein of FIG. 8) as described further below. Using a generally transverse orientation, the control element has a rear portion 46 and a rim channel end portion 52 and is preferably oriented transversely so as to be positioned on a transversely extending centerline B through the inlet running from front to back as in FIG. 3.

Figure 10:
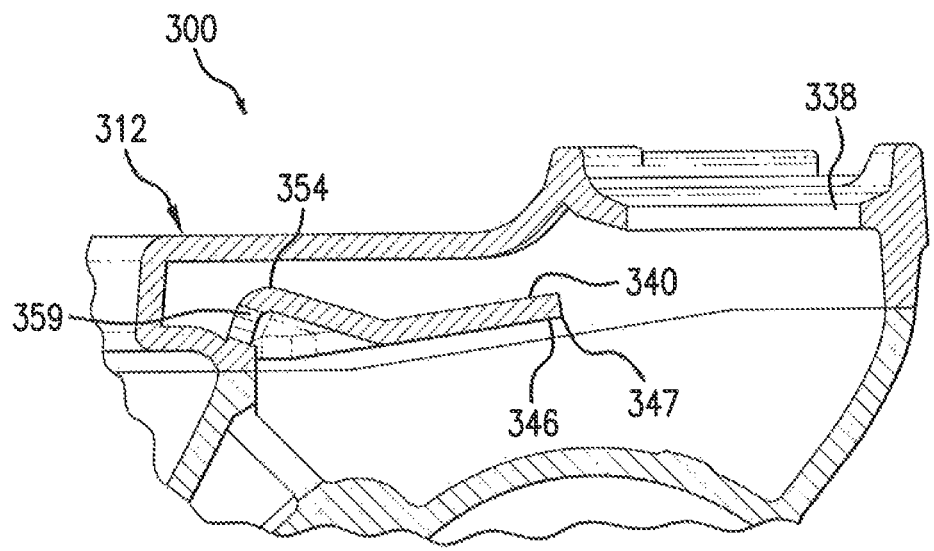
FIG. 10 is a greatly enlarged, partially cut-away perspective view of a control element according to one embodiment herein having a control element having a generally transversely extending configuration, wherein the rear portion extends backwards but is not located beneath the bowl inlet as implemented in Example 2.
Figure 11:
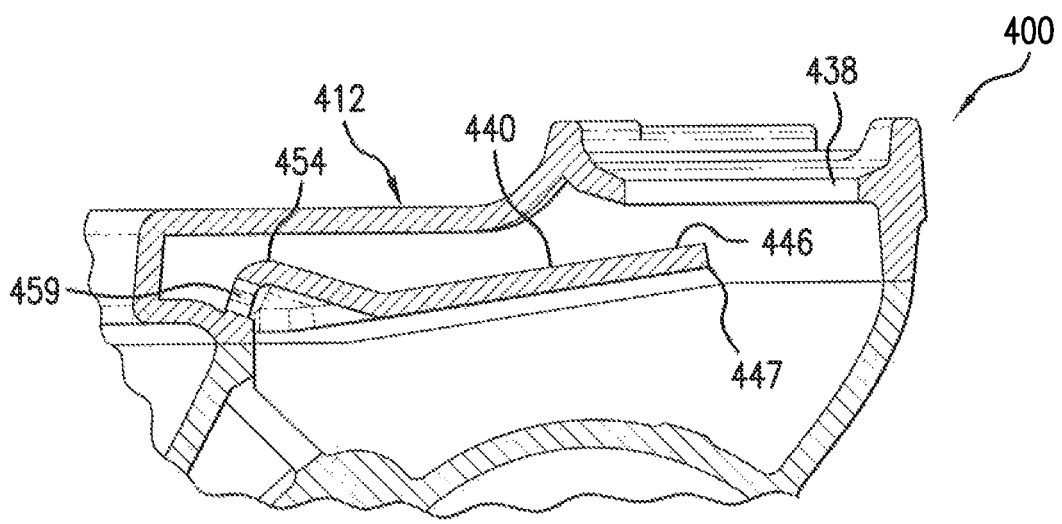
FIG. 11 is a greatly enlarged, partially cut-away perspective view of a control element according to another embodiment herein having a generally transversely extending configuration, wherein the rear portion extends backwards so as to be located beneath the bowl inlet as implemented in Example 3.

The rear portion 46 in this embodiment preferably includes an upwardly extending portion in the form of a wall 47 which is generally parallel to the longitudinal axis of the toilet bowl 12, but the wall 47 on the rear portion 46 may also be angled or sloped, or curved as in a "scoop" to provide different flow effects. The rear portion 46 may also be formed (as shown in FIGS. 10 and 11 in assembly embodiments 300 and 400 respectively) so as not to extend upwardly and have no additional wall area and/or to extend back more or less toward the back of the bowl. Thus, in some embodiments herein the rear portion 46 is within the cross-sectional area A defined by the toilet inlet 38 as shown in FIG. 4 or located beneath that area of the toilet inlet 38 directly within the traditional manifold area 41 (see embodiment of FIGS. 1-6 and FIG. 11) and in others, it does not extend back as far and so that the end 45 of the rear portion 46 may not be within or directly beneath the toilet inlet 38 (see embodiment of FIG. 10). If the rear portion and the end thereof does extend into the area A or beneath the area A in the traditional manifold area 41, the end of the rear portion of the control element preferably extends rearwardly at least about 5 mm so as to be within or beneath an area defined by the toilet bowl inlet. In other embodiments, it can be made to extend farther into the area A or so as to align with but beneath the area A by any length, preferably about 5 mm to about 35 mm, but can be about 10 mm, 15 mm, 20 mm, 30 mm, etc. into or beneath the area A. Preferably it is about 30 mm to about 35 mm into the area A or located so as to extend rearwardly beneath the area A.

Figure 8:
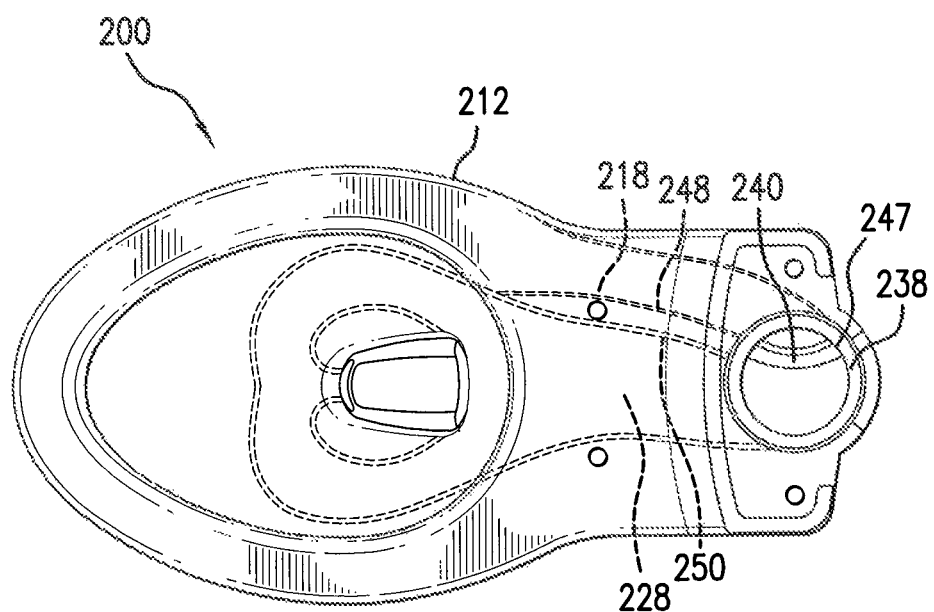
FIG. 8 is a top plan view of a further embodiment of a toilet herein having a control element which is generally vertically aligned within the toilet.

Embodiments herein not having an upwardly extending wall 47 are also particularly useful when using a control element with a toilet bowl having a toilet bowl inlet located on a rear 25 of the toilet bowl 10 instead of on an upper portion thereof as shown with inlet 38. Thus flush water introduced to the toilet bowl from the rear 25 of the toilet bowl would encounter the control element (such as control elements 340 and 440) from a transverse direction and directly contact the rear portion 346, 446 of those control elements and split over the control elements as otherwise described herein. It is also useful to employ a vertically aligned control element (as shown in FIG. 8) with a toilet having an inlet formed in the rear of the toilet instead of an upper portion thereof. To more greatly reduce turbulence and better divide fluid flow, the control element in a toilet having an inlet in the rear thereof, whether generally transversely or generally vertically aligned can be configured so a to extend backwards near or into the rear positioned inlet.

Figure 2:
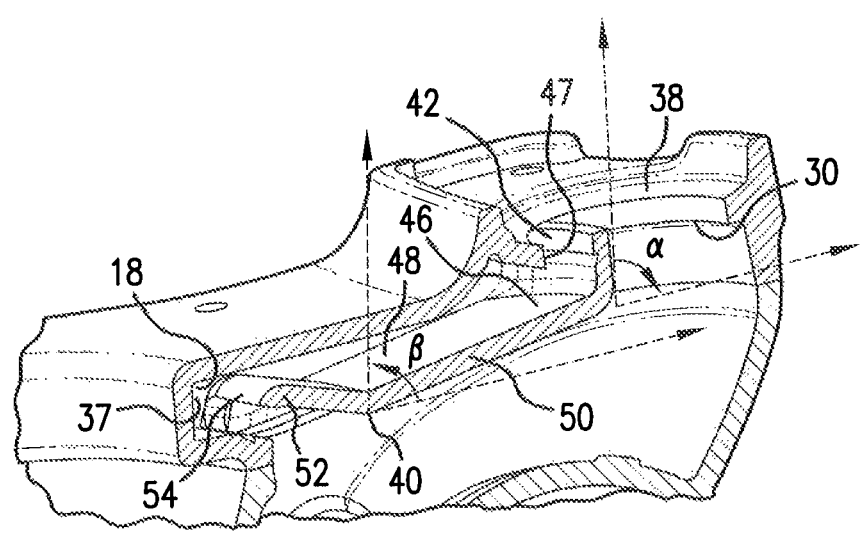
FIG. 2 is an enlarged cross-sectional view of a portion of FIG. 1.

As shown in the embodiment of FIGS. 1-6, the rear portion 46 has a smoothly curved upwardly extending wall 47. In that embodiment, the angle α that such a wall 47 on the rear portion 46 forms with a horizontal transverse plane as shown in FIG. 2 through the toilet bowl 12 preferably ranges from 0° to about 90° and preferably about 45° to about 90°. In other embodiments such a wall 47 may be omitted so that the rear portion is simply an extension of the body of the control element without an upwardly extending wall. The rear portion 46 of the control element 40 forces a split in fluid flow by leading fluid to flow around the control element as a dividing plate towards its rear portion which may be positioned in, near or beneath the inlet 38, wherein fluid flows along and above the upper surface 48 of the control element 40 to be directed to the rim 16, and flows beneath the bottom of the control element to be directed to the jet 26.

The jet inlet 30 (like rim channel inlet 42) also begins at the rearmost end of the rear portion 46 of the control element 40 where the control element divides entering flow so that fluid enters the direct-fed jet inlet 30 beneath the control element flowing through the lower portion of what would otherwise be the traditional manifold area and directly into what is the location of the more traditional jet inlet port 31 where the jet channel physically meets the manifold area. Thus, flow enters the toilet inlet, into the jet inlet 30 which is defined by the control element to be positioned where the flow splits, passes under the control element and into the more traditional jet port inlet 31. As used herein, the direct-fed jet inlet is inlet 30 and is moved backwards toward the inlet and defined by the control element. As shown in the preferred embodiment of FIGS. 1-6, the rear portion of the control element is a generally upwardly curved smooth end wall piece 47 as shown extending upwardly so as to divide the flow from the interior of the inlet 38 into new inlets, the rim channel inlet 42 and the direct-fed jet inlet 30.

The area 44 in the preferred embodiment wherein the rear portion 46 is within the cross-sectional area demarcated by the inlet 38 represents a division in flow through the toilet inlet 38. The cross-sectional area of the toilet inlet 38 as shown and as measured transversely across the toilet bowl 14 is preferably divided such that about 3% to about 50%, preferably about 3% to about 35% of the transverse cross-sectional area of the toilet inlet is directed to the inlet 42 of the rim channel defined by the control element in area 44 by the effect of the location of the upwardly extending wall 47 of the rear portion 46. If the rear portion 46 were formed as in the embodiment of FIGS. 10 and 11, wherein it is not upwardly extending, the length of the control element body as well as the position of the rear portion could be adjusted so as to divide upper and lower flow around the control element body by the same ratios of flow achieved by the area division noted above but without extending upwardly into or towards the toilet inlet. Instead, the inlets of the rim and jet would be defined by the control element so as to not extend as far upwards toward the inlet, but to be positioned more within the traditional zone of the toilet manifold while still allowing incoming flush water to be divided over and beneath the body of the control element.

The amount of flow directed to the rim and ultimately into the rim channel in the location where the control element meets the rim channel may be altered by varying the length of the control element or design of the rear portion (e.g., to include an upwardly extending wall) so long as the overall flow volume meets design requirements for the desired amount of rim channel flow and to account for flow dynamics and so that preferably an improvement in hydraulic properties is achieved.

In the embodiment of FIGS. 1-6, it is preferred that the ratio of the transverse cross-sectional area 44 of the inlet 42 of the rim channel as defined by the control element near the inlet 38 to the transverse cross-sectional area of the entire inlet 38 is about 0.03:1 to about 0.50:1, preferably about 0.03:1 to about 0.35:1. As shown, after fluid encounters the control element 40, a portion of the fluid flow is controlled so as to enter the rim channel 18 over the control element 40 and fluid passing through the toilet inlet 38 goes directly into the inlet port 42 of the rim channel and is actually guided by the control element into the more traditional inlet 37 area of the rim channel 18. The fluid that passes through the toilet inlet 38 but does not pass over the control element is divided so as to directly enter the jet channel 28 and pass beneath the control element making the direct-fed jet inlet 30 to the jet channel 28 defined so as to be closer to and just below the inlet 38 in what would ordinarily have been a larger manifold. Fluid is thus directed in desired volumes into the rim and jet channels and contributes to ensuring adequate pressurization of the rim channel in a balanced approach to provide excellent cleansing function from fluid passing out of openings 20 and waste removal as a result of the direct fed jet 26. The upwardly extending wall 47 of the rear portion 46 of the control element 40 may be configured so as to lie just below or even up into the top of the inlet 38. It is also within the scope of the invention to include a further extended wall on the rear portion 46 which extends further upwardly through the inlet and extends into the tank or into a specialty flush valve so long as the rear portion 46 is capable of dividing off flow as desired.

It is also within the scope of the invention to form the control element or merely a dividing portion thereof as a removably attachable piece for or unitary portion of an otherwise standard flush valve, such as a pop-up or flapper valve for example placed within a tank. Thus, one skilled in the art would understand from this disclosure that an existing flush valve could be manufactured so as to attach a control element 40 to a lower portion thereof upon installation allowing divided flow directly from the flush valve, or to have a dividing attachment that joins with a separately installed control element. Further, a control element or dividing portion can be formed as a portion of a unitary flush valve lower connecting piece for easily fitting within a toilet design either as a factory installed piece (or attachable piece) or as a replacement part for an existing toilet bowl.

As shown, after entering the rim channel inlet port 42, fluid flows across the upper surface 48 of a generally transversely extending body 50 of the control element 40. As positioned in the toilet bowl to direct fluid towards the primary area of the rim channel 18, "generally transverse" as used herein for the body 50 can accommodate an angle β with a horizontal plane through the toilet as shown in FIG. 2 to assist feeding fluid or can be generally flat to the horizontal depending on the flow effects desired. If angled off of the horizontal (either as a negatively or positively), angle β is preferably no greater than about 5 to about 10 degrees elevated or lowered. However, the angle may be varied for differing flow effects.

After passing over upper surface 48, the fluid passes over a second rim channel end portion 52 and directly into the traditional entrances or inlet(s) 37 of the rim channel 18. To better direct the flow of the fluid passing over the rim channel end portion 52 of the body 50 into the rim channel 18, the rim channel end portion 52 of the control element 40 may be configured so as to have an optional raised portion 54 configured to at least partially, or completely divide flow entering the rim channel into two separate and opposing streams each traveling away from rim channel inlet 42 and from traditional rim channel inlet(s) 37 and towards a front portion 55 of the rim channel 18. Preferably, the raised portion 54 directs the flow in a reasonably evenly divided manner into the right and left halves of the rim channel 18 for more even distribution through the rim channel. The raised portion 54 may be shaped in a variety of ways, such as a wedge, a more curved "hill" portion, or simply a divider that slightly angles flow towards either side. As shown an optional raised portion 54 is shaped as a curved hill portion that will direct water evenly to either side of the hill portion.

Figure 6:
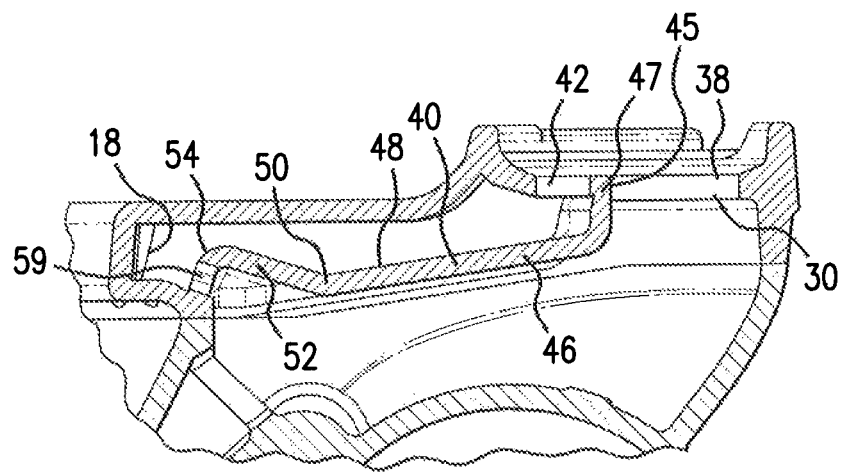
FIG. 6 is an enlarged control element portion of the assembly embodiment shown in FIG. 5.
Figure 7:
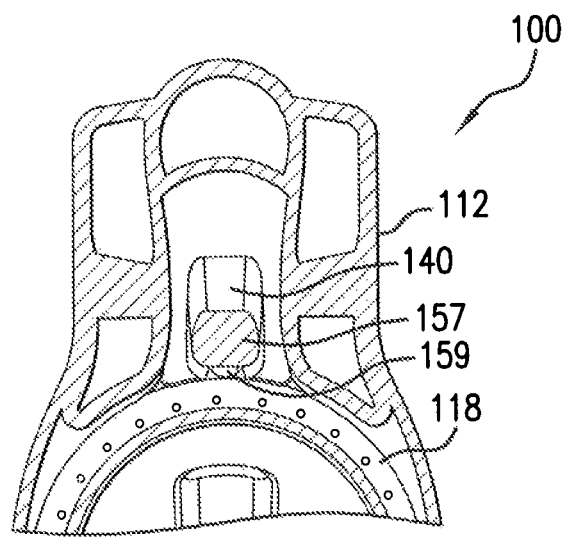
FIG. 7 is a top plan, transverse cross-sectional view of a toilet according to an embodiment herein having a toilet rim and control element with optional raised section.
Figure 12:
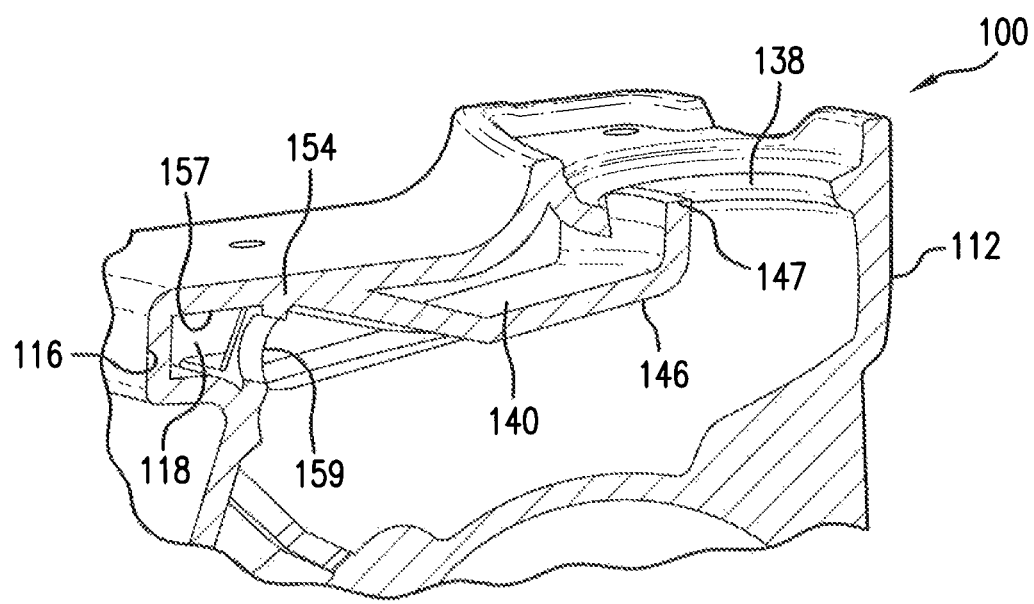
FIG. 12 is an enlarged, partially cut-away perspective view of a control element according to an embodiment herein which has a generally transversely extending configuration, an upwardly angled rear portion located beneath the bowl inlet, a raised rim portion that contacts an upper wall of the rim and an opening to allow communication from within the jet into the rim as implemented in Example 5 herein.

In the embodiment 100 shown in FIGS. 7 and 12, the toilet incorporates the features of FIGS. 1-6, and the control element is similar but is formed so that in the transverse cross-section of FIG. 7 through a sample raised portion 154 as shown in FIG. 12 (having a raised section having a curved side and a slightly expanded width at the rim channel end portion 52 of the control element 40), the raised portion 154 contacts an upper wall 157 of the rim 116. Thus, the optional raised portion 54 may be formed so as to extend part of the way towards the upper wall 57 of the rim 16 (as in the embodiment 10 shown in FIGS. 1-6) so that it not only divides the flow evenly into the two halves of the rim channel, but also allows a portion to flow over the center of the raised portion 54. Alternatively as shown in FIGS. 7 and 12, in the embodiment 100 of the assembly, the raised portion 154 can be formed so as to divide flow but extend upwardly so that it makes contact with the upper wall 157 of the rim 116. While flow does not pass over the center of the control element, this design can be most easily formed when the control element is formed as part of the chinaware through well-known casting processes. This embodiment can provide additional mechanical support to prevent deformation of the toilet during the green forming process, as would be understood by those skilled in the vitreous chinaware manufacturing art.

The control element 40 in various embodiments herein may also include an optional downstream communication opening 59. The opening 59 is defined by the end portion 52 of the rim channel. The opening 59 is preferably configured so as to allow flow of fluid and/or air from within the direct-fed jet into the rim channel. The opening 59 on the rim channel end 52 of the control element 40 is preferably positioned so as to be beneath the raised portion 54 of the rim channel end 52 of the control element. The opening 59 preferably also has a cross-sectional area of at least about 0.25 cm². The opening 59 allows flow of air and/or fluid/water between the jet channel 28 and rim channel 18 as necessary to eliminate any excessive pressure differential. When included, the downstream opening 59 can have a variety of geometrical cross-sectional shapes such as oval, elliptical, round, square, triangular, and the like. A circular shape is preferred to facilitate easy formation of the opening by punching if the raised portion is formed as part of the vitreous chinaware. While square or rectangular openings may also be cut into green clay as well, such shapes can contribute to a higher degree of dimensional variability. Further, more than one such opening 59 could be made, space permitting.

It is also possible to locate the downstream communication opening further downstream in the flow path. For example, a channel could be formed at the far front end of the bowl to connect the jet channel 28 and rim channel 18. Any such opening or channel reestablishing fluid communication between the rim channel 18 and jet channel 28 downstream of the rim inlet port 42 can also function at least partially to carry out an intended purpose of the downstream communication opening.

As flow separates into a first flow entering the inlet port 42 directed to the rim channel 18 and a second flow entering the direct-fed jet inlet port 30, in a direct manner the control element 40 operates to minimize effects that may occur in feeding the rim channel when an overall diameter of the trapway 14 becomes larger and/or the ratio of the volume of the trapway to the total flush volume is at least about 35% or more, and initiating siphon requires too much fluid into the direct fed jet channel as can happen in prior art designs. The control element divides a sufficient and an adjustable amount of flow (depending in the design and placement of the control element) to ensure an adequately pressurized rim even in larger diameter trapway toilets having larger waterways and/or a large volume trapway and/or a larger ratio of the trapway volume to total flush volume, and creates a more dependable flush ratio (which can also be adjusted by design and placement of a control element as noted above) in virtually all toilet bowl designs so that flow can be regulated in different water pressure, flush valve or other flow situations.

From the direct-fed jet inlet port 30, fluid flows into the jet channel 28 and ultimately through the direct-fed jet outlet port 32. From the inlet port 42 of the rim channel, fluid flows through the rim channel 18 in preferably both directions (or if the control element is configured differently on the rim channel end, the toilet bowl assembly could also be formed so as to flow in only one direction as shown in the embodiment 200 of FIG. 8). Fluid flows out through at least one, and preferably a plurality of rim outlet ports 20. While the rim opening or outlet ports 20 may be configured in various cross-sectional shapes (round, square, elliptical, triangular, slit-like, etc.), it is preferred for convenience of manufacturing that such ports are preferably generally round, and more preferably generally circular in cross-sectional configuration. They may also be cut at an angle to better direct flow into the toilet bowl.

In a toilet assembly 10 including a toilet bowl 12 as described herein, flush water passes from, for example, a water tank T into the toilet bowl 22 through the toilet bowl inlet 38 and, and into the inlet 42 of the rim channel due to operation of the control element, with the rest of the fluid entering directly into the jet channel through inlet 30. At the end 52 of the control element, the rim channel water can be directed to one or both halves of the rim channel. As noted above, the rim channel flow portion may be divided again, preferably evenly, by operation of the preferred raised portion 54 of the rim channel end portion 52 of the control element 40. Fluid that flows through the inlet port 30 of the direct-fed jet 26 and into the jet channel 28 flows to the jet outlet port 32 in the sump 24 and directs a strong, pressurized stream of water at the outlet of the bowl which is also the trapway opening 34. This strong pressurized stream of water is capable of rapidly initiating a siphon in the trapway 14 to evacuate the bowl and its contents to the sewer line in communication with sewage outlet 36. The water that flows through the rim channel 18 causes a strong, pressurized stream of water to exit the various rim outlet ports 20 which serves to cleanse the bowl during the flush cycle.

When the flush cycle has progressed to the extent that the entire jet channel 28 is filled with fluid, when fluid backs up toward the area of the control element 40, any additional fluid at that point can be fed into the rim channel 18 through an optional downstream opening 59 formed in the rim channel end portion 52 as described above. The fluid from the jet channel 28 passes through the direct-fed jet outlet port(s) 32 and converges again with water from the rim channel 18 in the bowl 22 of the toilet. The reunified stream exits the bowl through the trapway 14 on its way to the sewage outlet 36 and drain line.

The control element becomes particularly beneficial in designing high-performance toilets with large siphonic trapways in excess of about 50 mm diameter (and preferably even 60 mm or more) and/or large volume trapways having a volume of about 2000 ml or more. It is also useful when water consumption is pushed to very low levels below about 4.8 liters per flush. In a preferred embodiment, the trapway diameter is at least about 55 mm, and even more preferably at least about 60 mm. To initiate a strong siphon in these cases, it is preferable to combine the control element with a relatively large jet outlet port of at least about 6.5 cm$^2$, more preferably about 7.0 cm$^2$, and even more preferably about 10 cm$^2$. In another preferred embodiment ratio of the volume of the trapway to the total flush volume is at least about 35% or more.

In one embodiment herein, the control element can be aligned generally vertically within the toilet bowl. By "generally vertically," as used herein, the body of the control element is aligned so that while extending from front to back in the toilet, its surface 248 of the body 250 of the control element does not face upwardly, but the control element sits so as to be oriented on its side. It is within the scope of "generally vertically" that the body can be situated so as to not be perfectly aligned with the vertical axis of the toilet body and to vary to the left or right at various angles, preferably about 5 to 10 degrees in either direction, but it should be understood that the alignment of the various embodiments of the control element may be varied for different hydraulic design implementations.

As shown in toilet assembly 200 of FIG. 8, the control element 240 can be configured so as to be generally vertically positioned, thereby dividing flow from the inlet 238 to one side of the vertically aligned control element to direct flow to the rim channel 218 and to the other side of the vertically aligned control element to direct flow to the jet channel 228. This arrangement could be flipped as well with the rim channel and jet channel being configured on opposite sides from those shown in FIG. 8. This arrangement is most useful in a toilet bowl configured to have a single direct-fed jet channel that runs asymmetrically around one side of the toilet and/or where unidirectional flow is applied in the rim channel (either clockwise or counterclockwise). In such embodiments, the rim can be more readily fed in a generally tangential manner by arranging the control element vertically as in FIG. 8.

It should also be understood that the actual geometry used in the toilet bowl assembly of the present invention can be varied, but can still maintain the basic flow path as described above. For example, the direct-jet inlet port 42 can lead into one, single jet channel running asymmetrically around one side of the bowl, or it could lead into two, dual jet channels which run symmetrically or asymmetrically around both sides of the bowl. The actual pathway that fluid through the jet channel and rim channel travels can vary in three dimensions. Further, it should be understood that the control element 40 while described herein in one embodiment as having a generally upwardly extending wall on the rear portion and a preferred raised portion on the rim channel end of the body as well as to have a generally transversely extending body portion, may be modified so as to be arranged generally vertically, to sit on an angle in the toilet bowl, to have an angled, generally flat or differently shaped rearward dividing portion, to have a raised portion that extends only partially upward or completely upwardly toward the upper wall of the rim and/or to have a differently shaped rim channel end portion in order to vary flow effects, so long as the control element is positioned so as to divide fluid entering the bowl inlet in a desired ratio to strike an optimal performance between the pressurized rim for cleansing and sufficient power through the jet for achieving adequate waste removal through the trapway siphon even in lower water operating systems and/or larger diameter waterway toilets. All possible permutations of various direct-fed jet toilets may be used within the scope of this invention.

The inventors have discovered that by controlling the cross-sectional areas and/or volumes of the specified chambers and passageways, a toilet having a toilet bowl assembly according to the invention may be provided having exceptional hydraulic performance at low flush volumes, incorporating the bowl cleaning ability of various prior art rim-fed jet designs while also providing the bulk removal capability of various direct-fed jet designs. Information concerning the various pathways and their relationships is disclosed in detail in U.S. Patent Application Publication No. 2009/0241250 A1, incorporated in relevant part herein with respect to such rim and jet relationships and geometries and maximizing performance of a pressurized rim and direct-fed jet toilet assembly. It is noted that reference to the rim channel inlet port and direct-fed jet inlet port in that publication are to the traditional locations of a rim inlet port (such as location 37) and a direct fed jet inlet port (such as location 31) since the publication does not include a control element as described herein.

Pressurization of the rim in a direct-jet toilet provides the aforementioned advantages for bowl cleaning, but along with the control element herein also enables high performance to be extended to extremely low flush volumes or very large siphonic trapways, i.e. systems where the ratio of the volume of the trapway to the total flush volume is about 35% or greater. The inventors have found that pressurizing the rim has a dual impact on the hydraulic performance. Firstly, the pressurized water exiting the rim holes has greater velocity which, in turn, imparts greater shear forces on waste matter adhered to the toilet bowl. Thus, less water can be partitioned to the rim and more can be partitioned to the jet. Secondly, when the rim pressurizes, it exerts an increased back pressure over the rim inlet port, which in turn, increases the power and duration of the jet water. These two factors in combination provide for a longer and stronger jet flow, allowing the toilet designer the option of using a trapway with larger diameter and flow volume without loss of siphoning capability. Thus, pressurizing the rim not only provides for a more powerful rim wash, but it also provides for a more powerful jet, enables lower water consumption by reducing the water required to wash the rim, and enables a larger diameter trapway to be used at low flush volumes without loss of siphon. By incorporating also the advantage of an adjustable feature such as the control element that can be set to a desired ratio for a given toilet design, these same advantages can be found and optimized in a variety of toilet sizes and configurations, including standard toilet designs or larger toilets.

The ability to achieve the aforementioned advantages and provide exceptional toilet performance at flush volumes no greater than about 6.0 liters per flush (1.6 gallons per flush) relies on generally simultaneously pressurizing the rim channel 18 and direct jet channel 26 such that powerful streams of pressurized water generally simultaneously flow from the jet outlet port 32 and rim outlet ports 20. As used herein, "generally simultaneous" flow and pressurization means that each of the pressurized flow through the rim and the direct jet channel flow occur for at least a portion of the time that they occur at the same time, however, the specific initiating and terminating time for flow to the rim and jet channel may vary somewhat. That is, flow through the jet may travel directly down the jet channel and out the jet outlet port and enter the sump area at a time different from the entry of water passing through the rim channel outlets in pressurized flow and one of these flows may stop before the other, but through at least a portion of the flush cycle, the flows occur simultaneously. Use of the control element renders this principle easier to adjust and accommodate in design.

In general, the jet channels should be sized such that the range of cross-sectional areas is between the area of the jet inlet port and the jet outlet port. However, in practice, the jet channels are always at least partially filled with water, which makes the upper boundary on the cross sectional area of the jet channel somewhat less critical. There is, however, clearly a point where the jet channel becomes too constrictive or too expansive. Use of the control element can also assist in this regard. The cross sectional area of the rim channel is also less important, because the rim is not intended to be completely filled during the flush cycle, however, the impact that any enlarged trapway or waterway may have on reducing adequate flow to the rim channel is avoided by use of the control element. Computational Fluid Dynamics (CFD) simulations clearly show that water rides along the lower wall of the rim channel, and when all of the rim outlet ports become filled, pressure begins to build in the air above the layer of water. Increasing the size of the rim would thus reduce the rim pressure proportionally. But the effect would likely be minor within the expected range of aesthetically acceptable toilet rims. There is also, of course, a lower limit where the cross sectional area of the rim becomes too constrictive. At minimum, the cross sectional area of the rim channel should exceed the total area of the rim outlet ports.

In addition to the relationships noted above and in U.S. Publication No. 2009/0241250 A1 as incorporated herein, certain other geometrical details are relevant to achieving the preferred functions of the invention. In general, all of the water channels and ports should be preferably designed to avoid unnecessary constriction in flow. Constriction can be present as a result of excessive narrowing of a passageway or port or through excessive bends, angles, or other changes in direction of flow path. For example, a jet channel could have a cross-sectional area within the desired range, but if it turns sharply, energy will be lost due to turbulence generated by the changes in direction. Or, the average cross-sectional area of the jet might be within the desired range, but if it varies in cross-sectional area such that constrictions or large openings are present, it will detract from the performance. In addition, channels should be designed to minimize the volume required to fill them without unduly constricting the flow of water. Furthermore, the angles at which the ports encounter the flowing water can have an impact on their effective cross sectional area. For example, if the rim inlet port is placed in a position parallel to the flow path of the water, less water will enter the port than if a port of equal cross sectional area is placed perpendicular to the direction of flow. Likewise, the predominant flow of water through the hydraulic channels of the toilet is downward. Ports that are positioned in a downward direction to the flowing water will have a larger effective area than those that are placed in an upward direction.

In practice, high performance, low water usage toilets under the present invention can be readily manufactured by standard manufacturing techniques well known to those skilled in the art. The geometry and cross sectional areas of the jet inlet port, rim inlet port, rim channels, jet channels, jet outlet ports, and rim outlet ports can be controlled by the geometry of the molds used for slip casting or accurately cut by hand using a gauge or template and the amount of fluid entering the rim or jet channels thereby also adjusted by the use of a suitable control element.

The inventions herein will now be further illustrated through the following non-limiting Examples. The Examples are provided to demonstrate the usefulness and function of various embodiments of the invention but are not intended to limit the scope of the invention.

EXAMPLES

Data from the Examples are summarized in Table 1. In all of the subsequent Examples, several geometrical aspects of toilets will be presented and discussed. The geometrical factors are defined and measured as follows:

"Jet outlet port area": This is measured by making a clay impression of the jet opening and comparing it to a grid with 0.10 inch (0.254 cm) sections.

"Rim outlet port area": This is calculated by measuring the diameter of the rim holes and multiplying by the number of holes for each given diameter.

"Trap diameter": The average diameter of a trapway with a generally circular cross section. In practice, the trapway diameter is said to be ⅛" larger than the largest rigid sphere that can pass through the trapway without obstruction. This is measured by passing spheres with diameter increments of 1/16 of an inch through the trapway. For designs analyzed by CFD, the trapway diameter was rigidly defined in the CAD design.

"Trap volume": This is the volume of the entire length of the trapway from inlet in the sump to outlet at the sewage drain. It is measured by plugging the outlet of the trapway and filling the entire length of the trapway with water until it backs up to the trapway inlet. It is necessary to change the position of the bowl during filling to ensure that water passes through and fills the entire chamber. For designs analyzed by CFD, the trapway volume was extracted from the CAD software (in this case, ProEngineer) by defining the area explained above.

"Peak flow rate": This is measured by initiating a flush cycle of the complete toilet system and collecting the water discharged from the outlet of the toilet directly into a vessel placed on a digital balance. The balance is coupled to a computer with a data collection system, and mass in the vessel is recorded every 0.05 seconds. The peak flow rate is determined as the maximum of the derivative of mass with respect to time (dm/dt).

"Peak flow time": This is calculated along with the peak flow rate measurement as the time between initiation of the flush cycle and occurrence of the peak flow rate.

"Rim pressure": This is measured by drilling a hole in the top of the toilet rim at the 9 o'clock position, considering the location of traditional inlet to the rim port as 12:00 (i.e., ignoring the inlet created by the control element and considering instead the inlet where fluid begins to flow into the rim channel). An airtight connection was made between this hole and a Pace Scientific® P300-10"D pressure transducer. The transducer was coupled to a data collection system and pressure readings were recorded at 0.005 second intervals during the flush cycle. These data were then smoothed by averaging eight sequential readings, resulting in 0.040 second intervals. CFD simulations were also utilized to calculate rim pressure throughout the flush cycle for various experimental toilet geometries. The interval time of pressure calculations for the CFD simulations was also 0.040 seconds. The area under the pressure time plot in inches of $H_2O$.s during the flush cycle (i.e., the integral of the curve) is taken as the standard measure of rim pressure. This integral is dependant on the absolute flush volume and therefore, must be given in the context of the experimental flush volume. In general, the integral will increase in linear proportion to the flush volume. A toilet with a rim pressure of 3 inches of $H_2O$.s at 4.8 liters per flush would be expected to provide a rim pressure of 3.75 inches of $H_2O$.s at 6.0 liters per flush, i.e., 25% higher. The actual value could be somewhat higher still, as higher flush volumes could be achieved by higher water level (or head pressure) in the tank, which will raise the average pressure proportionally. The time of sustained pressurization will also vary approximately linearly with flush volume.

"Bowl Scour": This is measured by applying an even coating of a paste made from 2 parts miso paste mixed with one part water to the interior of the bowl. The material is allowed to dry for a period of three minutes before flushing the toilet to assess its bowl cleaning capability. A semi-quantitative "Bowl Scour Score" is given using the following scale:

5—All of the test media is completely scoured away from the bowl surface in one flush.

4—Less than 1 square inch of total area is left unwashed on bowl surface after one flush and is totally removed by a second flush.

3—Greater than 1 square inch of total area is left unwashed on the bowl surface after one flush and is totally removed by a second flush.

2—Less than ½ square inch of total area is left unwashed on bowl surface after two flushes.

1—Greater than ½ square inch area is left unwashed on the bowl surface after two flushes.

0—Greater than ½ square inch area is left unwashed on the bowl surface after three flushes.

Comparative Example 1

Figure 9:
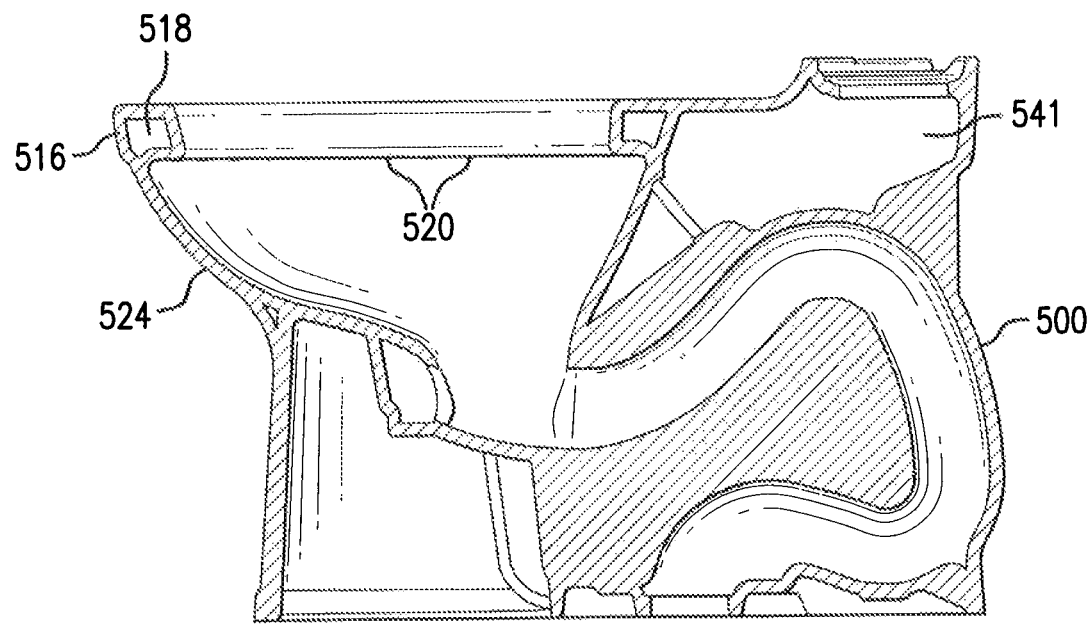
FIG. 9 is a side elevational cross-sectional view of a toilet bowl prepared for a Comparative Example herein.

A toilet was formed using the information and dimensions as described in U.S. Patent Application Publication No. 2009/0241250 A1 and scaling the toilet up to a toilet bowl having a nominal trapway diameter of 60.3 mm. A cross-sectional view of the toilet 500 formed is shown in FIG. 9. CFD simulations of a 4.8 liter flush were conducted with the geometry pictured in FIG. 9. The jet outlet port was circular with a 40 mm diameter and the cross-sectional area of the primary manifold 541 was 78 cm$^2$. Thirty-two circular rim outlet ports 520 of 4 mm diameter each were uniformly distributed around the underside of the rim 516. The rim outlet ports 520 were cut at a downward 45° angle parallel to the direction of flow through the rim channel 518 and at an angle of around 15° outward with respect to the direction of flow to better direct the water towards the walls of the bowl 524. All other parameters, cross-sectional areas, and ratios thereof were within the desired parameters and relationships described in U.S. Patent Application Publication No. 2009/0241250 A1.

The CFD simulations revealed that the previously disclosed technology was not readily scalable to a toilet system with a trapway on the order of 60 mm diameter, 2,275 ml trapway volume, and ratio of the volume of the trapway to the total flush volume of about 47%, The flow rate required to initiate a strong siphon in a trapway of this magnitude necessitated an extremely large cross-sectional area in the primary manifold and jet channels. Flow to the rim was greatly diminished by enhanced flow into the large and relatively unrestricted jet channels. Although acceptable hydraulic character was achieved in the siphon as evidenced by a peak flow rate of 4,400 ml/s being reached in 0.58 s, the flow to the rim was inadequate for reliable bowl cleansing. Only 325 ml of water exited the rim outlet ports and the integral of the pressure time curve of the rim was only 1.15 in. H$_2$O.s. The results are tabulated along with those of subsequent inventive Examples herein in Table 1.

Example 2

Using the same toilet prepared for Comparative Example 1, an attempt was made to increase the flow of water to the rim of the toilet, by adding a variation of the control element to the design and its impact was evaluated through CFD simulations of a 4.8 liter flush. The control element selected for this example is pictured in FIG. 10. The rim channel end portion of the control element included the optional raised portion and the optional downstream communication opening between the jet channel and rim channel. The rear portion of the control element was configured so as not to extend into the area directly beneath the bowl inlet, beginning instead roughly 40 mm downstream of the front edge of the bowl inlet. All other geometrical features were identical to those of Comparative Example 1, including use of the trapway diameter of 60.3 mm and jet outlet port diameter of 40 mm. As displayed in Table 1, the inclusion of the control element has only a small effect on the strength of the siphon as demonstrated by a relatively unchanged peak flow rate of 4,400 ml/s at 0.55 s into the flush and showed improvement, with 350 ml flowing from the rim outlet ports (an increase of 8%) and an integral of the pressure against time curve for the rim increased to 1.8 in H$_2$O.s.

Example 3

A further attempt to increase the improvements shown in Example 2 by increasing the flow of water to the rim of the toilet was attempted in a second variation of the control element which was added to the same toilet design of Comparative Example 1 and Example 2 and its impact evaluated through CFD simulations of a 4.8 liter flush. The control element selected for this Example is pictured in FIG. 11. The forward portion of the control element included the optional raised portion and optional downstream opening which were made to be identical in geometry to the control element of Example 2. However, the rear portion of the control element was configured to extend about 30 mm (as measured transversely extending down the mid-line of the toilet bowl extending from the front to the back of the toilet bowl) into the area beneath the bowl inlet. Both of the control elements of Examples 2 and this Example had a generally transversely extending configuration as shown in FIGS. 10 and 11 and did not include an optional upwardly extending wall. All other geometrical features of the toilet were identical to those of Comparative Example 1 and Example 2, including the trapway diameter of 60.3 mm and jet outlet port diameter of 40 mm.

As displayed in Table 1, extending the control element further upstream into the area beneath and as outlined by the bowl inlet had a surprisingly dramatic increase on the flow of water to the rim and the resultant efficacy of the rim wash. The flow out of the rim ports increased by 42% to 463 ml without major compromise in the hydraulic character of the siphon. A peak discharge rate of 3,920 ml/s was achieved in 0.62 s. The integral of the rim pressure time curve grew 222% to 3.7 in H$_2$O.s, demonstrating a significant increase in energy available for bowl cleaning during the flush.

Example 4

In another attempt to further increase the flow of water to the rim of the toilet, yet a third variation of the control element was added to the toilet configuration of the previous Examples and its design and impact on flow evaluated through CFD simulations of a 4.8 liter flush. The control element selected for this example is shown in FIG. 6. The rim channel end portion of the control element was configured to include the optional raised portion and the optional opening from the jet channel to the rim channel in the same manner and having the same geometry as was used in Examples 2 and 3. However, in this Example, a rear portion having an upwardly extending wall was provided to the control element and configured so as to extend upwardly into the area demarcated by the bowl inlet in the location of the rear portion of Example 3, but also extending upwardly. All other geometrical features of the toilet bowl were identical to those of the preceding Examples, including the trapway diameter of 60.3 mm and jet outlet port diameter of 40 mm. As displayed in Table 1, the upwardly extending wall on the control element further increased volumetric flow to the rim but lead to a slight decrease in the integral of the rim pressure time curve. The peak discharge rate was increased relative to Example 3 to 4,130 ml/s. Examination of the flow images from the CFD calculations indicated that the upwardly extending wall feature of the control element serves to reduce turbulence in the flow path immediately below the bowl inlet, and upstream from the main body of the control element. The upwardly extending wall appeared to organize flow above and below the control element in a more efficient manner, as demonstrated by the increase in peak discharge rate. However, all of the inventive embodiments herein and the different variations and options demonstrated applicability and delivered performance enhancements over the prior art of the Comparative Example.

Example 5

A toilet of a geometry equivalent to that used in the simulation of Example 4 was produced out of vitreous china by techniques known in the art. The control element of this sample, however, as seen in FIG. 12, included an optional raised portion which extended to the top wall of the toilet rim, dividing flow to the left and right of the control element. The control element further included an optional downstream communication window of circular geometry. To demonstrate the extremely robust siphonic capabilities of the invention, the trapway diameter and volume were increased to 63.5 mm and 2,550 ml, respectively. The resulting ratio of the volume of the trapway to the total flush volume was about 53%. All other geometrical features were identical (within measurement capability) to those of Example 4, including the jet outlet port diameter of 40 mm and rim outlet configuration. The toilet bowl was subjected to a full battery of hydraulic and performance tests at a flush volume of 4.8 l. The peak discharge rate was measured at 3,800 ml/s at 1.02 s into the flush, indicating strong hydraulic performance despite the extremely large trapway diameter and volume, and the relatively low flush volume. Some disagreement with the values obtained from the various CFD simulations was expected, as the experimental conditions for measuring the flow rate incorporate some impact effects that cannot yet be totally accurately simulated. The pressure in the rim was experimentally measured at 3.7 in. $H_2O$.s and pressure was sustained for a period of 0.8 s.

The toilet was also subjected to flush tests that mimic real life scenarios. The first test was to evaluate bulk removal using the test known in the industry as the Maximum Performance Test (MaP) developed by Veritec Consulting Inc. The test involves flushing subsequently larger numbers of 50 g latex-encased miso sausages. The MaP score is defined as the largest load that can be successfully cleared for a minimum of 4 out of 5 trials, up to a defined maximum of 1,000 g. The toilet of Example 5 successfully cleared 1,000 g of encased miso in 5 out of 5 trials with a 4.8 l flush, for a MaP score of 1,000. The bowl washing capability was evaluated with an internally developed Bowl Scour test. The toilet achieved a perfect score of 5 at a 4.8 l flush volume, signifying complete cleaning of the bowl surface in a single flush cycle.

Comparative Example 6

A prior art commercially available dual flush toilet from Briggs Plumbing Co. (Model No. 4211 Conserver™ HET) was dimensionally analyzed and subjected to the same battery of hydraulic and performance tests at its specified full flush volume of 6.0 l and partial flush volume of 3.8 l. This toilet includes a horizontal wall formed into the chinaware that separates the primary manifold into upper and lower sections that would divide flow between the rim and jet channels, but this structure is formed into a toilet configured such that the division of flow does not provide an advantage. On best estimation and belief upon examination, the horizontal wall appeared to have been designed in an attempt to extend the length of the primary manifold and to end coincident to the beginning of the area defined by the toilet inlet. However, variability in manufacturing will produce units wherein such a horizontal wall could extend up to 5 mm into the area defined by the inlet or so as to end several millimeters downstream of this area. The horizontal wall in the toilet evaluated did not include an upward extending portion or a downstream communication port.

The peak discharge rate of the Briggs toilet was measured at 2,546 ml/s at an extremely slow 2.77 s into the flush, indicating a generally weak hydraulic performance. The cross sectional area of the jet outlet port was 6.4 $cm^2$ and the trapway diameter and volume were small at 50.8 mm and 1,800 ml, respectively. The resulting ratio of the volume of the trapway to the total flush volume was only 30%. Thus, although the toilet includes a feature formed in its chinaware structure that could divide flow, it does not deliver an acceptable level of performance as achieved in the current invention by incorporating a control element as described herein in a toilet having a large diameter and/or large volume siphonic trapway and/or a large jet outlet port and/or when the ratio of the volume of the trapway to the total flush volume is at least about 35% or greater at the inlet area ratios provided herein.

It should be noted that the while the ratio of the trapway volume to total flush volume during the 3.8 l partial flush cycle for the Briggs toilet was 47%, the resulting flush cycle did not meet the three general purposes of a flush cycle as discussed in the Background of the Invention section above and was therefore inadequate. Based on this criteria and the size, the 3.8 l cycle of this toilet would thus not be capable of removing sufficient quantities of solid waste to the drain line.

When subjected to flush tests that mimic real life scenarios, the Briggs toilet did perform poorly. The toilet successfully cleared 400 g of encased miso in 4 out of 5 trials with the 6.0 l flush cycle for a MaP score of 400. The bowl washing capability was evaluated using the Bowl Scour test. The toilet achieved a score of 3 at the 6.0 l flush volume, signifying that more than 1 square inch of bowl surface was left unwashed after one flush, requiring a second 6.0 l flush for complete cleaning of the bowl surface. While the toilet made according to one embodiment of the present invention in Example 5 was capable of removing 1,000 g of encased miso and completely cleaning the bowl surface with only 4.8 l of water, the Briggs toilet would require 12 l (i.e. two flushes) to remove only 400 g and completely clean the bowl.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

TABLE 1

| | Flush Volume (ml) | Area of Jet Outlet Port (cm²) | Area of Rim Outlet Ports (cm²) | Trapway Diam. (mm) | Trapway Volume (ml) | Ratio of Trapway Volume to Flush Volume | Peak Rate (ml/s) | Time to Peak (s) | Rim Outlet Volume (ml) | % Increase in Rim Flow | Rim Pressure (in. H₂O) | % Increase in Rim Pressure | MaP Score (g) | Miso Scour Score (1-5) |
|---|---|---|---|---|---|---|---|---|---|---|---|---|---|---|
| Comp. Ex. 1 | 4800 | 12.6 | 4.02 | 60.3 | 2275 | 47% | 4400 | 0.58 | 325 | — | 1.15 | 57% | N/A | N/A |
| Ex. 2 | 4800 | 12.6 | 4.02 | 60.3 | 2275 | 47% | 4400 | 0.55 | 350 | 8% | 1.8 | 222% | N/A | N/A |
| Ex. 3 | 4800 | 12.6 | 4.02 | 60.3 | 2275 | 47% | 3920 | 0.62 | 463 | 42% | 3.7 | 161% | N/A | N/A |
| Ex. 4 | 4800 | 12.6 | 4.02 | 60.3 | 2275 | 47% | 4130 | 0.62 | 500 | 54% | 3 | — | N/A | N/A |
| Ex. 5 | 4800 | 12.6 | 4.02 | 63.5 | 2550 | 53% | 3800 | 1.02 | 750 | — | 3.7 | — | 1000 | 5 |
| Comp. Ex. 6 | 6000 | 6.4 | 4.10 | 50.8 | 1800 | 30% | 2546 | 2.77 | 1100 | — | 4.85 | — | 400 | 3 |

We claim:

1. A siphonic, gravity-powered toilet bowl assembly having a toilet bowl, the toilet bowl comprising
    a toilet bowl inlet in fluid communication with a source of fluid;
    a rim around an upper perimeter of the toilet bowl and defining a rim channel, the rim having an inlet port in fluid communication with the toilet bowl inlet and at least one rim outlet port;
    a bowl outlet in fluid communication with a sewage outlet;
    a direct-fed jet having an inlet port in fluid communication with the toilet bowl inlet for receiving fluid, the direct-fed jet also in fluid communication with a trapway and the bowl outlet for discharging fluid; and
    a control element having a rear portion, the control element arranged in communication with the toilet bowl inlet for controlling flow from the source of fluid passing through the toilet bowl inlet and dividing the flow of fluid entering the toilet bowl inlet into the inlet port of the rim channel and into the inlet port of the direct-fed jet, wherein the inlet port of the rim channel and the inlet port of the direct-fed jet are defined by the control element and an end of the rear portion of the control element extends rearwardly at least about 5 mm so as to be within or beneath an area defined by the toilet bowl inlet.

2. The siphonic, gravity-powered toilet bowl assembly according to claim 1, wherein the flush volume is less than about 4.8 liters.

3. The siphonic, gravity-powered toilet bowl assembly according to claim 1, wherein a ratio of a volume of the trapway to a total flush volume is at least about 35%.

4. The siphonic, gravity-powered toilet bowl assembly according to claim 3, wherein the ratio of the volume of the trapway to the total flush volume is about 40% to about 55%.

5. The siphonic, gravity-powered toilet bowl assembly according to claim 1, wherein the trapway diameter exceeds about 63.5 mm.

6. The siphonic, gravity-powered toilet bowl assembly according to claim wherein the trapway has a trapway volume of at least about 2000 ml.

7. The siphonic, gravity-powered toilet bowl assembly according to claim 1, wherein the toilet bowl inlet is positioned over a manifold area including the control element.

8. The siphonic, gravity-powered toilet bowl assembly according to claim 1, wherein the control element has a generally vertically extending body having a rim channel end portion and the control element directs flow to opposite sides of the body of the control element, wherein flow on one side enters the rim channel and on the other side enters the direct-fed jet.

9. The siphonic, gravity-powered toilet bowl assembly according to claim 1, wherein the control element has a generally transversely extending body and a rim channel end portion, and wherein the rear portion of the control element and the rim channel portion direct flow over the control element into the rim channel.

10. The siphonic, gravity-powered toilet bowl assembly according to claim 9, wherein the rear portion of the control element forms a generally upwardly extending wall directed towards or into the inlet of the toilet bowl.

11. The siphonic, gravity-powered toilet bowl assembly according to claim 10, wherein the upwardly extending wall of the rear portion of the control element forms an angle of 0° to about 90° with a horizontal transverse plane through the toilet bowl.

12. The siphonic, gravity-powered toilet bowl assembly according to claim 11, wherein the assembly comprises a tank portion having an outlet in communication with the toilet bowl inlet and wherein the rear portion of the control element extends upwardly into the tank.

13. The siphonic, gravity-powered toilet bowl assembly according to claim 1, wherein the rear portion of the control element extends upwardly so that the end of the rear portion is within or above the toilet bowl inlet.

14. The siphonic, gravity-powered toilet bowl assembly according to claim 1, wherein the toilet is capable of operating at a flush volume of no greater than about 6.0 liters and the water exiting the at least one rim outlet port is pressurized such that an integral of a curve representing rim pressure plotted against time during a 6.0 liter flush cycle exceeds 3 in. H₂O.s.

15. The siphonic, gravity-powered toilet bowl assembly according to claim 1, wherein an integral of a curve representing rim pressure plotted against time during a 6.0 liter flush cycle exceeds 5 in. H₂O.s.

16. The siphonic, gravity-powered toilet bowl assembly according to claim 1, wherein the toilet is capable of providing flow from the at least one rim channel outlet port which is pressurized in a sustained manner for a period of time.

17. The siphonic, gravity-powered toilet bowl assembly according to claim 16, wherein the period of time is at least 1 second during a 6.0 l flush cycle.

18. The siphonic, gravity-powered toilet bowl assembly according to claim 16, wherein the toilet is capable of providing the sustained pressurized flow from the at least one rim channel outlet port generally simultaneously with flow through the direct-fed jet.

19. The siphonic, gravity-powered toilet bowl assembly according to claim 1, wherein the toilet is capable of operating at a flush volume of not greater than about 4.8 liters.

20. The siphonic, gravity-powered toilet according to claim 1, wherein the toilet further comprises a mechanism that enables operation of the toilet using at least two different flush volumes.

21. The siphonic, gravity-powered toilet bowl assembly according to claim 1, wherein the toilet bowl inlet has a diameter of about 48 mm to about 150 mm.

22. The siphonic, gravity-powered toilet bowl assembly according to claim 21, wherein the diameter of the toilet bowl inlet is about 63 mm to about 102 mm.

23. The siphonic, gravity-powered toilet bowl assembly according to claim 1, wherein a ratio of a cross-sectional area of the rim channel inlet defined by the control element to the cross-sectional area of the toilet bowl inlet is about 0.03:1 to about 0.50:1.

24. The siphonic, gravity-powered toilet bowl assembly according to claim 23, wherein the ratio of the cross-sectional area of the rim channel inlet defined by the control element to the cross-sectional area of the toilet bowl inlet is about 0.03:1 to about 0.35:1.

25. The siphonic, gravity-powered toilet bowl assembly according to claim 1, wherein the direct-fed jet has an outlet port in fluid communication with the bowl outlet for discharging fluid and the direct-fed jet outlet port has a cross-sectional area of at least about 6.5 cm$^2$.

26. The siphonic, gravity-powered toilet bowl assembly according to claim 1, wherein the control element has a rim channel end that comprises a raised portion configured to at least partially divide flow into the rim channel into two separate and opposing streams each traveling away from the rim channel inlet and towards a front portion of the rim channel.

27. The siphonic, gravity-powered toilet bowl assembly according to claim 26, wherein the raised portion of the rim channel end of the control element contacts an upper wall of the rim.

28. The siphonic, gravity-powered toilet bowl assembly according to claim 26, wherein the toilet comprises a downstream communication opening configured to allow flow of fluid and/or air from within the direct-fed jet into the rim channel.

29. The siphonic, gravity-powered toilet bowl assembly according to claim 28, wherein the downstream communication opening is defined by the rim channel end of the control element and is positioned so as to be beneath a raised portion of the rim channel end of the control element.

30. The siphonic, gravity-powered toilet bowl assembly according to claim 29, wherein the opening has a cross-sectional area of at least about 0.25 cm$^2$.

31. The siphonic, gravity-powered toilet bowl assembly according to claim 1, wherein the end of the rear portion of the control element extends rearwardly from at least about 5 mm to about 35 mm.

32. A siphonic, gravity-powered toilet bowl assembly having a toilet bowl, the toilet bowl comprising
a toilet bowl inlet in fluid communication with a source of fluid;
a rim around an upper perimeter of the toilet bowl and defining a rim channel, the rim having an inlet port in fluid communication with the toilet bowl inlet and at least one rim outlet port;
a bowl outlet in fluid communication with a sewage outlet;
a direct-fed jet having an inlet port in fluid communication with the toilet bowl inlet for receiving fluid and an outlet port in fluid communication with the bowl outlet for discharging fluid, wherein the direct-fed jet outlet port has a cross-sectional area of at least about 6.5 cm$^2$; and
a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet, wherein the inlet port of the rim channel and the inlet port of the direct-fed jet are defined by the control element and an end of the rear portion of the control element extends rearwardly so as to be within or beneath an area defined by the toilet bowl inlet.

33. The siphonic, gravity-powered toilet bowl assembly according to claim 32, wherein the direct-fed jet is also in fluid communication with a trapway having a trapway volume of at least about 2000 ml.

34. The siphonic, gravity-powered toilet bowl assembly according to claim 32, wherein a ratio of a volume of the trapway to a total flush volume is at least about 35%.

35. The siphonic, gravity-powered toilet bowl assembly according to claim 32, wherein the control element has a rim channel end that comprises a raised portion configured to partially or completely divide flow into the inlet of the rim channel into two separate and opposing streams each traveling away from the rim channel inlet and towards a front portion of the rim channel.

36. The siphonic, gravity-powered toilet bowl assembly according to claim 35, wherein the raised portion of the rim channel end of the control element contacts an upper wall of the rim.

37. The siphonic, gravity-powered toilet bowl assembly according to claim 32, further comprising a downstream communication opening configured to allow flow of fluid and/or air from within the direct-fed jet into the rim channel.

38. The siphonic, gravity-powered toilet bowl assembly according to claim 37, wherein the opening is defined by the rim channel end of the control element and is positioned so as to be beneath a raised portion of the rim channel end of the control element, and the opening has a cross-sectional area of at least about 0.25 cm$^2$.

39. A siphonic, gravity-powered toilet bowl assembly having a toilet bowl, the toilet bowl comprising
a toilet bowl inlet in fluid communication with a source of fluid;
a rim around an upper perimeter of the toilet bowl and defining a rim channel, the rim having an inlet port in fluid communication with the toilet bowl inlet and at least one rim outlet port;
a bowl outlet in fluid communication with a sewage outlet;
a direct-fed jet having an inlet port in fluid communication with the toilet bowl inlet for receiving fluid and an outlet port in fluid communication with the bowl outlet for discharging fluid; and
a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet, wherein the inlet port of the rim channel and the inlet port of the direct-fed jet are defined by the control element and the control element has a rim channel end that comprises a raised portion configured to at least partially divide flow into the rim channel into two separate and opposing streams each traveling away from the rim channel inlet and towards a front portion of the rim channel and an end of the rear portion of the control element extends rearwardly so as to be within or beneath an area defined by the toilet bowl inlet.

40. The siphonic, gravity-powered toilet bowl assembly according to claim 39, wherein the direct-fed jet is also in fluid communication with a trapway having a trapway volume of at least about 2000 ml.

41. The siphonic, gravity-powered toilet bowl assembly according to claim 39, wherein a ratio of a volume of the trapway to a total flush volume is at least about 35%.

42. The siphonic, gravity-powered toilet bowl assembly according to claim 39, wherein the raised portion of the rim channel end of the control element contacts an upper wall of the rim.

43. The siphonic, gravity-powered toilet bowl assembly according to claim 39, wherein the end of the rear portion of the control element extends rearwardly at least about 5 mm.

44. The siphonic, gravity-powered toilet bowl assembly according to claim 39, further comprising a downstream communication opening configured to allow flow of fluid and/or air from within the direct-fed jet into the rim channel.

45. The siphonic, gravity-powered toilet bowl assembly according to claim 44, wherein the downstream communication opening is defined by the rim channel end of the control element and is positioned so as to be beneath the raised portion of the rim channel end of the control element, wherein the downstream communication opening has a cross-sectional area of at least about 0.25 cm$^2$.

46. The siphonic, gravity-powered toilet bowl assembly according to claim 39, wherein the direct-fed jet outlet port has a cross-sectional area of at least about 6.5 cm$^2$.

47. A siphonic, gravity-powered toilet having a toilet bowl, the toilet bowl comprising
a toilet bowl inlet in fluid communication with a source of fluid;
a rim around an upper perimeter of the toilet bowl and defining a rim channel, the rim having an inlet port in fluid communication with the toilet bowl inlet and at least one rim outlet port;
a bowl outlet in fluid communication with a sewage outlet;
a direct-fed jet having an inlet port in fluid communication with the toilet bowl inlet for receiving fluid, the direct-fed jet also in fluid communication with the bowl outlet for discharging fluid; and
a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet and an end of the rear portion of the control element extends rearwardly so as to be within or beneath an area defined by the toilet bowl inlet,
wherein the inlet port of the rim channel and the inlet port of the direct-fed jet are defined by the control element and the toilet bowl is configured so that the rim channel and the direct-fed jet are capable of introducing fluid into the bowl in a sustained pressurized manner and wherein a ratio of a cross-sectional area of the rim channel inlet defined by the control element to a cross-sectional area of the toilet inlet is about 0.03:1 to about 0.50:1.

48. The siphonic, gravity-powered toilet bowl assembly having the toilet according to claim 47, wherein the ratio of the cross-sectional area of the rim channel inlet defined by the control element to the cross-sectional area of the toilet inlet is about 0.03:1 to about 0.35:1.

49. The siphonic, gravity-powered toilet bowl assembly having the toilet according to claim 47, wherein a ratio of a volume of the trapway to a total flush volume is at least about 35%.

50. The siphonic, gravity-powered toilet bowl assembly having the toilet according to claim 47, wherein the end of the rear portion of the control element extends rearwardly at least about 5 mm.

51. The siphonic, gravity-powered toilet bowl assembly having the toilet according to claim 47, wherein the toilet comprises a downstream communication opening configured to allow flow of fluid and/or air from within the direct-fed jet into the rim channel.

52. In a siphonic, gravity-powered toilet bowl assembly having a toilet bowl, a direct-fed jet and a rim defining a rim channel and having at least one rim channel opening, wherein fluid is introduced into the bowl through a toilet bowl inlet into the direct-fed jet and into the at least one rim channel opening, a method for providing a toilet capable of operating at a flush volume of no greater than about 6.0 liters, the method comprising:
introducing fluid from a fluid source through a toilet bowl inlet; and
directing the fluid through a control element arranged in communication with the toilet bowl inlet for controlling flow from the source of fluid passing through the toilet bowl inlet so that a portion of the fluid enters an inlet port of a rim channel and a second portion enters an inlet port of a direct-fed jet, wherein the control element divides the flow of fluid entering the toilet bowl inlet into the inlet port of the rim channel and into the inlet port of the direct-fed jet, wherein the inlet port of the rim channel and the inlet port of the direct-fed jet are defined by the control element, and the second rim channel portion directs the flow over the control element into the rim channel,
wherein fluid flows through a rim around an upper perimeter of the toilet bowl defining a rim channel from the rim channel inlet port to at least one rim outlet port, and fluid flows through a direct-fed jet from the direct-fed jet inlet port to a bowl outlet in fluid communication with a sewage outlet for discharging fluid, and wherein the fluid flows from the direct-fed jet into an interior of the toilet bowl under pressure and from the at least one rim channel opening in a sustained pressurized manner.

53. The method according to claim 52, wherein the toilet is capable of operating at a flush volume of not greater than about 4.8 liters.

54. The method according to claim 52, wherein a ratio of a cross-sectional area of the rim channel inlet defined by the control element to a cross-sectional area of the toilet inlet is about 0.03:1 to about 0.50:1.

55. The method according to claim 52, wherein the direct-fed jet is also in fluid communication with a trapway having a trapway volume of at least about 2000 ml and/or the direct-fed jet outlet port has a cross-sectional area of at least about 6.5 cm$^2$ and/or a ratio of a volume of the trapway to a total flush volume of at least about 35%.

56. The method according to claim 52, wherein the control element has a rim channel end that comprises a raised portion, and the method further comprises dividing the first portion of fluid entering the inlet of the rim channel into two separate and opposing streams each traveling away from the rim channel inlet and towards a front portion of the rim channel.

57. The method according to claim 52, wherein an end of the rear portion of the control element extends rearwardly at least about 5 mm so as to be within or beneath an area defined by the toilet bowl inlet.

58. The method according to claim 52, wherein the toilet further comprises a downstream communication opening and the method further comprises allowing fluid and/or air to flow from within the direct-fed jet into the rim channel.

59. A siphonic, gravity-powered toilet bowl assembly having a toilet bowl, the toilet bowl comprising
a toilet bowl inlet in fluid communication with a source of fluid;
a rim around an upper perimeter of the toilet bowl and defining a rim channel, the rim having an inlet port in fluid communication with the toilet bowl inlet and at least one rim outlet port;
a bowl outlet in fluid communication with a sewage outlet;
a direct-fed jet having an inlet port in fluid communication with the toilet bowl inlet for receiving fluid, the direct-fed jet also in fluid communication with a trapway and the bowl outlet for discharging fluid, wherein the trapway has a trapway volume of at least about 2000 ml; and
a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet, wherein the inlet port of the rim channel and the inlet port of the direct-fed jet are defined by the control element and an end of the rear portion of the control element extends rearwardly so as to be within or beneath an area defined by the toilet bowl inlet.

60. A siphonic, gravity-powered toilet bowl assembly having a toilet bowl, the toilet bowl comprising
a toilet bowl inlet in fluid communication with a source of fluid;
a rim around an upper perimeter of the toilet bowl and defining a rim channel, the rim having an inlet port in fluid communication with the toilet bowl inlet and at least one rim outlet port;
a bowl outlet in fluid communication with a sewage outlet;
a direct-fed jet having an inlet port in fluid communication with the toilet bowl inlet for receiving fluid, the direct-fed jet also in fluid communication with a trapway and the bowl outlet for discharging fluid; and
a control element arranged in communication with the toilet bowl inlet for controlling flow from the source of fluid passing through the toilet bowl inlet and dividing the flow of fluid entering the toilet inlet into the inlet port of the rim channel and into the inlet port of the direct-fed jet, wherein the inlet port of the rim channel and the inlet port of the direct-fed jet are defined by the control element and the toilet further comprises a downstream communication opening for allowing flow of fluid and/or air from within the direct-fed jet to enter into the rim channel and an end of the rear portion of the control element extends rearwardly so as to be within or beneath an area defined by the toilet bowl inlet.

61. The siphonic, gravity-powered toilet bowl assembly having a toilet bowl according to claim 60, wherein the toilet is capable of operating at a flush volume of not greater than about 4.8 liters.

62. The siphonic, gravity-powered toilet bowl assembly having a toilet bowl according to claim 60, wherein a ratio of a cross-sectional area of the rim channel inlet defined by the control element to a cross-sectional area of the toilet inlet is about 0.03:1 to about 0.50:1.

63. The siphonic, gravity-powered toilet bowl assembly having a toilet bowl according to claim 60, wherein the direct-fed jet is also in fluid communication with a trapway having a trapway volume of at least about 2000 ml and/or the direct-fed jet outlet port has a cross-sectional area of at least about 6.5 cm$^2$ and/or a ratio of a volume of the trapway to a total flush volume of at least about 35%.

64. The siphonic, gravity-powered toilet bowl assembly having a toilet bowl according to claim 60, wherein the control element has a rim channel end that comprises a raised portion for further dividing flow through the first portion of fluid entering the inlet of the rim channel into two separate and opposing streams each traveling away from the rim channel inlet and towards a front portion of the rim channel.

65. The siphonic, gravity-powered toilet bowl assembly having a toilet bowl according to claim 64, wherein the downstream communication opening is defined by the rim channel end of the control unit and is positioned so as to be beneath the raised portion of the rim channel end of the control element.

66. The siphonic, gravity-powered toilet bowl assembly having a toilet bowl according to claim 65, wherein the downstream communication opening has a cross-sectional area of at least about 0.25 cm$^2$.

67. The siphonic, gravity-powered toilet bowl assembly having a toilet bowl according to claim 60, wherein the end of the rear portion of the control element extends rearwardly at least about 5 mm.

* * * * *